(12) United States Patent
Yousuf et al.

(10) Patent No.: US 11,634,149 B2
(45) Date of Patent: *Apr. 25, 2023

(54) METHOD OF USING A SINGLE CONTROLLER (ECU) FOR A FAULT-TOLERANT/FAIL-OPERATIONAL SELF-DRIVING SYSTEM

(71) Applicant: NVIDIA Corporation, Santa Clara, CA (US)

(72) Inventors: Mohammed Abdulla Yousuf, San Jose, CA (US); T. Y. Chan, San Jose, CA (US); Ram Ganapathi, San Jose, CA (US); Ashok Srinivasan, Palo Alto, CA (US); Mike Truog, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,283

(22) Filed: Nov. 22, 2021

(65) Prior Publication Data

US 2022/0080992 A1 Mar. 17, 2022

Related U.S. Application Data

(62) Division of application No. 15/881,426, filed on Jan. 26, 2018.

(Continued)

(51) Int. Cl.
*B60W 50/04* (2006.01)
*G06F 11/20* (2006.01)

(Continued)

(52) U.S. Cl.
CPC .......... *B60W 50/045* (2013.01); *B60W 10/04* (2013.01); *B60W 10/18* (2013.01);
(Continued)

(58) Field of Classification Search
CPC .... B60W 50/045; B60W 10/04; B60W 10/18; B60W 10/20; B60W 2050/0043;
(Continued)

(56) References Cited

U.S. PATENT DOCUMENTS

| | | | |
|---|---|---|---|
| 6,490,511 B1 * | 12/2002 | Raftari | B60W 20/11 903/910 |
| 2017/0066440 A1 * | 3/2017 | Koravadi | G08G 1/164 |
| 2017/0277604 A1 * | 9/2017 | Wang | G06F 11/184 |

* cited by examiner

*Primary Examiner* — Rodney A Butler
(74) *Attorney, Agent, or Firm* — Nixon & Vanderhye P.C.

(57) ABSTRACT

In a self-driving autonomous vehicle, a controller architecture includes multiple processors within the same box. Each processor monitors the others and takes appropriate safe action when needed. Some processors may run dormant or low priority redundant functions that become active when another processor is detected to have failed. The processors are independently powered and independently execute redundant algorithms from sensor data processing to actuation commands using different hardware capabilities (GPUs, processing cores, different input signals, etc.). Intentional hardware and software diversity improves fault tolerance. The resulting fault-tolerant/fail-operational system meets ISO26262 ASIL-D specifications based on a single electronic controller unit platform that can be used for self-driving vehicles.

20 Claims, 19 Drawing Sheets

Related U.S. Application Data

(60) Provisional application No. 62/524,283, filed on Jun. 23, 2017.

(51) Int. Cl.
| | |
|---|---|
| *B60W 10/04* | (2006.01) |
| *B60W 10/18* | (2012.01) |
| *G05D 1/00* | (2006.01) |
| *G06F 11/18* | (2006.01) |
| *G06F 11/16* | (2006.01) |
| *G06F 11/14* | (2006.01) |
| *B60W 10/20* | (2006.01) |
| *B60W 50/00* | (2006.01) |

(52) U.S. Cl.
CPC ........... *B60W 10/20* (2013.01); *G05D 1/0088* (2013.01); *G06F 11/1487* (2013.01); *G06F 11/1641* (2013.01); *G06F 11/182* (2013.01); *G06F 11/188* (2013.01); *G06F 11/2023* (2013.01); *B60W 2050/0043* (2013.01); *B60W 2050/0075* (2013.01); *G06F 2201/805* (2013.01)

(58) Field of Classification Search
CPC ....... B60W 2050/0075; B60W 50/023; B60W 2050/0006; G05D 1/0088; G06F 11/1487; G06F 11/1641; G06F 11/182; G06F 11/188; G06F 11/2023; G06F 2201/805
See application file for complete search history.

Fig. 4

SAE Level 4 Automation:
The driving mode-specific performance by a system of all aspects of the dynamic driving task, providing appropriate responses to relevant objects and events, even if a driver does not respond appropriately to a request to resume performance of the dynamic driving task.

| Automation Level | Dynamic Driving Sub-Tasks | | Functional Capability | |
|---|---|---|---|---|
| | Sustained Execution of Lateral and/or Longitudinal Control | Object & Event Detection and Response (OEDR) | Fallback Performance of Dynamic Driving Task | Driving Mode Circumstance, Location Capabilities |
| Level 3 Conditional Automation | System | System | Driver | Driver – Some driving modes |
| Level 4 High Automation | System | System | System | Driver – Some driving modes |
| Level 5 Full Automation | System | System | System | System |

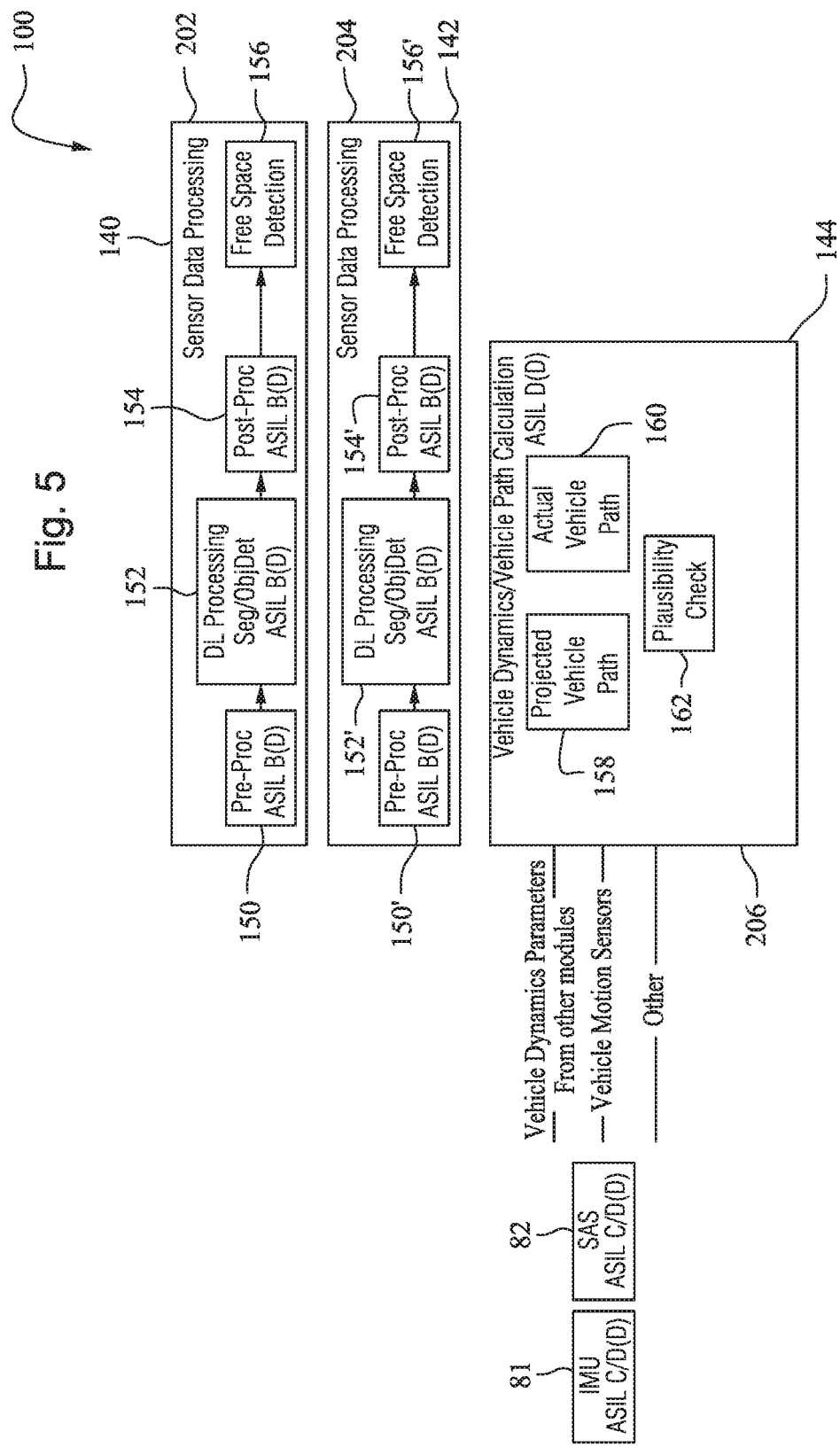

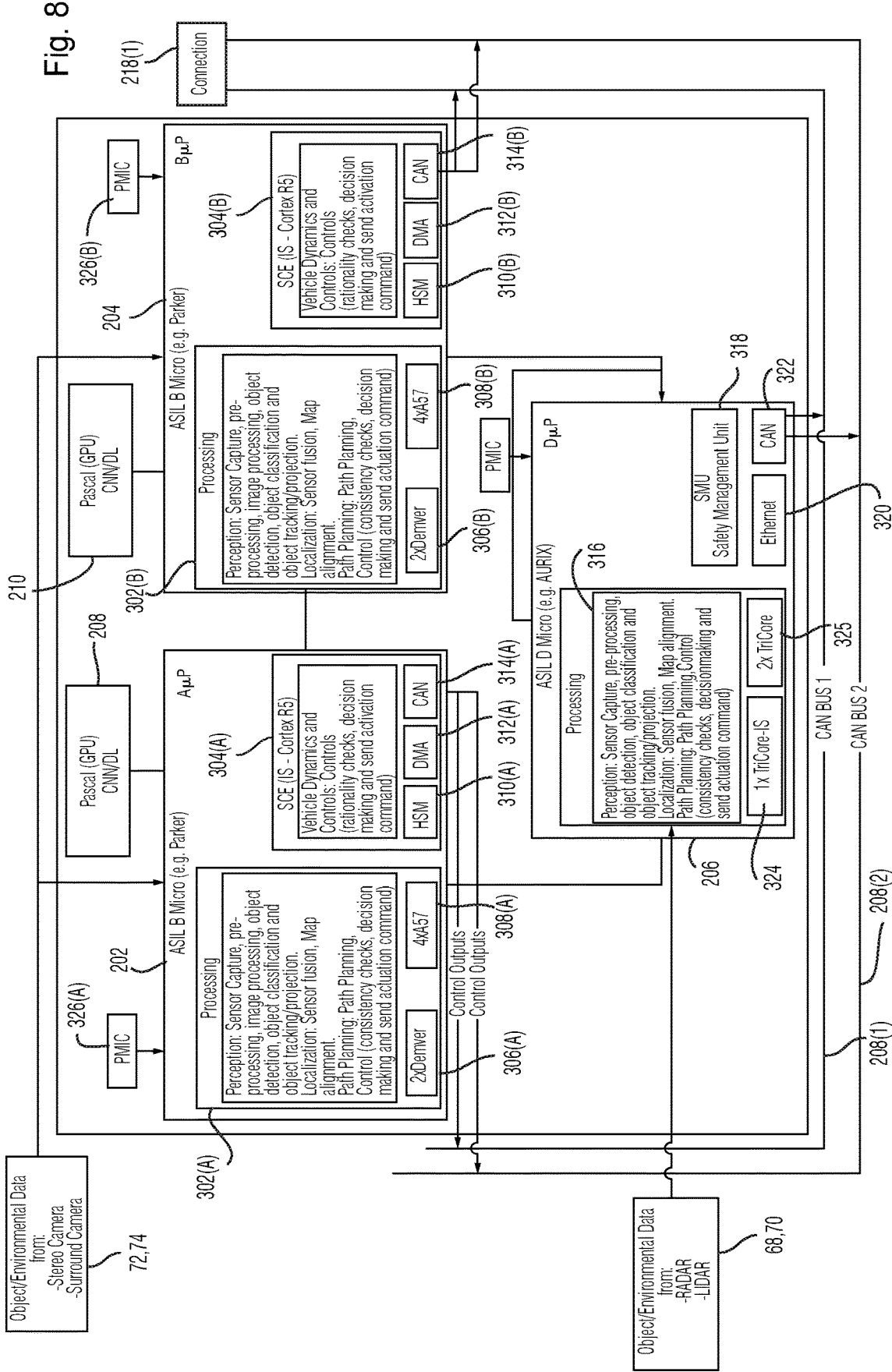

Fig. 10

| State Definition | Fault Reaction at Aurix | Parker A State | Parker A Fault Reaction | Parker B State | Parker B Fault Reaction | ExWD corrective action | DrivePx2 System State | System Functionality | Vehicle State |
|---|---|---|---|---|---|---|---|---|---|
| Normal Operation | None | Safe | None | Safe | None | None | Safe | Active control | Safe |
| Parker A CAT1 Fault | Parker A operational. Primary control outputs from Aurix | Safe (Recovery) | Parker A detects and recovers | Safe | None | None | Safe | Active control | Safe |
| Parker B CAT1 Fault | Parker B operational. Primary control outputs from Aurix | Safe | None | Fail silent (Recovery) | Parker A detects and recovers | None | Safe | Active control | Safe |
| Parker A CAT2 Fault | Switches to Parker B and initiates Parker A recovery. If needed Parker A will be power-cycled. Primary control outputs from Aurix | Fail silent (Recovery) | None | Safe | None | ExWD - PA initiates fault reaction and PA recovery | Safe Aurix and Parker B detect fault by SOH check of Parker A | Active control Notify Driver for Service | Safe |
| Parker B CAT2 Fault | Switches to Parker A and initiates Parker B recovery. If needed Parker A will be power-cycled. Primary control outputs from Aurix | Safe | None | Fail silent (Recovery) | None | ExWD - PB initiates fault reaction and PB recovery | Safe Aurix and Parker A detect fault by SOH check of Parker B | Active control Notify Driver for Service | Safe |
| Aurix CAT2 Fault | Switch control to Parker A &/or Parker B. Parker A &/or Parker B acts a backup control | Safe | None | Safe | None | ExWD - A initiates fault reaction and Aurix recovery | Fault tolerant (Recovery) | Active control Notify Driver for Service | Safe |
| CAT3 Fault | Notify actuating systems and to driver for appropriate reaction | NA | NA | NA | NA | NA | Safe (Recovery) | Limited control Notify Driver for Service | Safe |

METHOD OF USING A SINGLE CONTROLLER (ECU) FOR A FAULT-TOLERANT/FAIL-OPERATIONAL SELF-DRIVING SYSTEM

CROSS-REFERENCE TO RELATED APPLICATIONS

This application is a divisional of U.S. application Ser. No. 15/881,426, filed Jan. 26, 2018, now U.S. Pat. No. 11,214,273; which claims benefit of U.S. Provisional Patent Application Ser. No. 62/524,283 filed Jun. 23, 2017, all of which are incorporated herein by reference in their entirety and for all purposes.

STATEMENT REGARDING FEDERALLY SPONSORED RESEARCH OR DEVELOPMENT

None.

FIELD

This technology relates to fault-tolerant computer systems, and more particularly to a multi-processor system that is able to continue to perform critical system tasks despite failure of one or more processors. Still more particularly, one aspect relates to an autonomous control system with fault-tolerant features that permit automation to continue upon failure of one or more processors of a multi-processor system.

BACKGROUND & SUMMARY

In many autonomous self-driving vehicle settings, the number of processors placed on board a vehicle has increased dramatically. Up-integration sometimes allows the same controller to provide multiple functions (e.g., ACB, ECU and brake actuation could all be provided within the same module). This approach saves space on board the vehicle and has some other advantages as well. However, current fault-tolerant or fail-operational self-driving systems in vehicles (e.g., Airplane, Space Shuttle, self-driving cars) usually have one or more backup system in addition to the primary control system. In case of failure of the primary system, the backup system(s) keep the vehicle running until safe end of trip. This is a costly and resource intensive complex architecture.

The approach provided by example non-limiting embodiments herein provides added redundancy and fault-tolerance without adding more controllers or other controller hardware to the vehicle. With only one supercomputer (ECU), the integration is very simple. This also saves significant amounts of engineering cost.

BRIEF DESCRIPTION OF THE DRAWINGS

The following detailed description of exemplary non-limiting illustrative embodiments is to be read in conjunction with the drawings of which:

FIG. 4 shows example Levels 3-5 automation specifications,

FIG. 5 shows example non-limiting automation functions performed by different processors.

FIG. 8 shows an example non-limiting functional diagram for a three-processor self-driving automation system.

FIG. 10 is a table showing example non-limiting fault states, modes and actions.

DETAILED DESCRIPTION OF EXAMPLE NON-LIMITING EMBODIMENTS

Figure 1:
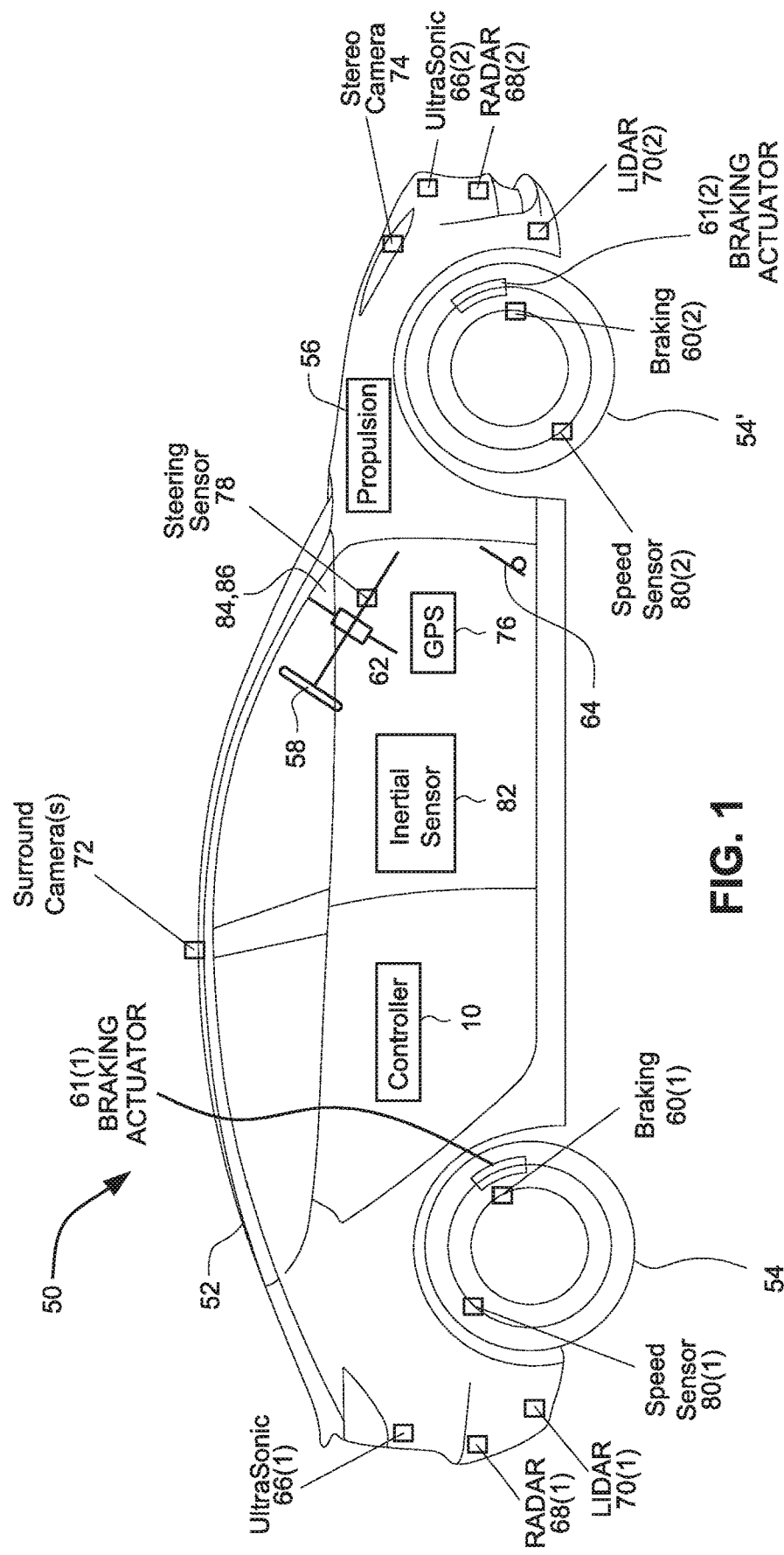
FIG. 1 is an example non-limiting embodiment of a self-driving vehicle.

NVIDIA Corporation has developed a controller for a self-driving system called DRIVE™PX 2. There are currently two versions of DRIVE™PX 2: AutoChauffeur and AutoCruise.

NVIDIA now offers a single-processor configuration of DRIVE™PX 2 for AutoCruise functions—which include highway automated driving HD mapping while enabling vehicles to use deep neural networks to process data from multiple cameras and sensors. The DRIVE™PX 2 can understand in real time what is happening around the vehicle, precisely locate itself on an HD map, and plan a safe path forward. Scalable architecture is available in a variety of configurations ranging from one passively cooled mobile processor operating at low power to multichip configurations with two mobile processors and two discrete GPUs delivering many trillion deep learning operations per second. Multiple DRIVE™PX 2 platforms can be used in parallel to enable fully autonomous driving.

DRIVE™2 systems can use data from multiple cameras as well as lidar, radar and ultrasonic sensors. This allows algorithms to accurately understand the full 360-degree environment around the car to produce a robust representation, including static and dynamic objects. Use of deep neural networks and classifications of objects dramatically increases the accuracy of the resulting fused sensor data. A smaller form factor DRIVE™PX 2 for AutoCruise handles functions including highway automated driving as well as HD mapping. The AutoChauffeur configuration provides two systems on a chip (SoC's) and two discrete CPUs for point-to-point travel. Multiple fully configured DRIVE™PX 2 systems can be integrated in a single vehicle to enable fault-tolerant autonomous driving.

The AutoChauffeur version has three processors: two Parker processors and one Aurix processor. AutoCruise has two processors; one Parker and one Aurix. One possibility for a self-driving vehicle with fault tolerances is to use a "2-box" solution—with one AutoChauffeur module and one AutoCruise module providing a total of five processors with built-in redundancy. However, in some contexts it may be desirable to provide a less complex and more cost effective approach using a single-controller (i.e., "1-box") while still providing adequate fault tolerance.

Increased fault tolerance is a desirable goal. When a part of a self-driving system fails, the system should be able to recover automatically and continue to function in autonomous mode at least to safely pull over to the side of the road if not to complete the mission and drive to the end point.

An example non-limiting embodiment solving this problem has three or more processors, or in some cases exactly three processors, as part of the architecture of the main controller. Additional processors may be distributed throughout the vehicle to perform additional, specialized functions.

Each of the three main controller processors independently obtains sensor information, independently processes and independently actuates peripheral devices used to control the vehicle or other apparatus. In the example non-limiting embodiments, each of the three processors is independently powered.

The example non-limiting embodiment is thus able to use a single controller for an autonomous self-driving system, with redundancy provided through the independence of redundant computation. In example non-limiting embodiments, much of the functionality required to provide autonomous operation is duplicated in software or firmware between the different processors. Thus, in some implementations, similar algorithms are run in all three processors. All relevant inputs gathered by sensors are fed into each of the three processors. Each of the three processors independently processes the sensor data, and independently provides actuation to peripheral devices.

If one of the three processors fails for any reason, the two other processors continue to operate. Because they are performing operations that are redundant to the operations that would have been performed by the failed processor, autonomy and its associated critical functions can still be maintained when any one of the three processors fails.

In the example non-limiting embodiment, all three processors continually perform the redundant processing for which they have been programmed. This provides a "hot standby" except that there is no "standby"—all three processors are continually processing in real time and therefore stay up to date with respect to all of the input data and state changes that ensue. This provides rapid response/recovery since the non-failed processors do not need to "catch up" when another processor fails.

By providing such a single controller solution, no backup is needed. This provides a technique of minimal intervention where it is possible to use a more conventional less complicated architecture and then double up on the functionality so multiple modules do the same thing; and then provide arbitration outside of the controller at the brakes or the lights or throttle or other actuator(s) that is being controlled. Minimal arbitration circuitry outside of the controller is able to handle two independently generated control signals that may not match because they are independently generated.

In example non-limiting embodiments, each of the three processors provides sufficient processing speed so redundant functionality can be executed in real time. The various processors are accordingly selected to provide sufficient execution capabilities. If one of the processors should fail, the disclosed architecture can continue to function but generally speaking, it is usually also desirable to immediately notify the operator of the vehicle that a repair is necessary.

In some example non-limiting implementations, all three processors receive the same inputs or at least have access to the same inputs. For example, all three processors may be connected to a common bus (or an arrangement of multiple redundant buses) and are thereby able to access the same information. On the other hand, due to the independent processing performed by the three different processors, there is no requirement that each processor must use all of the inputs that the other processor(s) are using in order to calculate a result. For example, in one possible implementation, a first processor may make decisions based on radar input only, whereas another processor may make similar decisions based on a fusion of both radar and lidar. In another possible implementation, two of the three processors may each receive radar and lidar information, and the third processor may receive radar, lidar and camera information in order to detect objects—or alternatively, two of the processors may receive lidar, radar and camera information while the third processor processes based on lidar and radar but not camera information.

In example non limiting implementations, each of the three processors monitor the other two processors. The monitoring protocol can be a challenge response type protocol or it could be more complex. The processors can cooperate with one another, make requests to one another and expect results within a certain time frame. If the results check out, and the response was provided within the appropriate time frame, then the processor checking up on the other one(s) can conclude that the other processor(s) are healthy and properly functioning. Meanwhile, the other processor may be doing the same thing to check up on its peers on a continual basis. When one of the processors detects that another processor has failed, the detecting processor sends out a message indicating the failure which allows the overall system to adapt to the failure. This message can also be used to notify the driver, Such a notification message can also generate a service request/warning. For example, a body module and/or IP instrument cluster can notify the driver. Such a message could be on the order of "there is something wrong with your autopilot system, please take over manual driving and have the autopilot serviced," hi the meantime, if there is sufficient confidence that the remaining functionality is still adequate, the autonomous self-driving system can still function autonomously until the end of the trip.

Thus, the example technology herein provides methodology about architecting a fault-tolerant/fail-operational system that meets ISO26262 ASIL-D based on a single ECU/controller platform that can be used for self-driving vehicles.

PROBLEM BEING RESOLVED

Single ECU/controller solution to provide system fault-tolerance/fail-operation for self-driving vehicle
Meets system safety integrity requirements per ISO26262
No need for a backup system to provide fail-operation functionality
Non-Limiting Benefits:
Single ECU/controller solution for self-driving vehicle.
Reduce cost (compared to system with a primary system and one or more backup system(s)
Reduced system complexity
Competitive value proposition (Tier1 &/OEMs)
Be ahead of the competition with system solution for self-driving car by using a single ECU/controller
Example System Features:
1. Monitoring of each processor with other processors (ASIL-B micro 1 monitors ASIL-B micro 2 and ASIL-D micro SOH and take appropriate safe action when needed)
2. Independent power supply to 2 ASIL-B processors and the ASIL-D processor (no common cause failure)

3. Redundant algorithm executing in 2 ASIL-B micros from sensor data processing to actuator control commands using the GPU, ASIL-B Micro cores, and safety engine (SCE) and controls algorithm executing in ASIL-D Micro 4. Keep system operational even after one or two processors have failed w/appropriate driver notification and safe end of trip The example architecture meets the safety requirements (per ISO26262), functional requirements, resource requirements with simple and elegant solution with optimized/reduced system latency (faster system recovery in case of a detected unrecoverable/fatal fault).

3. Independence of the multiple processors in terms of sensor data processing, execute applications and generate actuation commands and deliver the command(s) to actuation system(s).

Alternatives:

1. A possible alternative is to architect a fail-operational autonomous driving system with two or more controllers that will include a primary control system and at least one or more backup system(s) to meet the system safety integrity requirements. This increases complexity of implementing and robustly validate such a system. It also may increase system latency. It increases system cost in order for having additional hardware, software, wiring, and packaging.

2. Another alternative is to provide the same functionality over a distributed network of controllers. The challenge with this approach is the inconsistency among distributed nodes in terms of time synchronization and uncoordinated control outputs that may lead to conflicting system outputs (e.g., accelerating and braking at the same time).

Example Self-Driving Autonomous Vehicle

FIG. 1 shows an example self-driving vehicle 50. Vehicle 50 may be any kind of vehicle, manned or unmanned, but in the example shown comprises a passenger vehicle such as a car or truck that can accept a human driver and in some cases also human passengers. Vehicle 50 includes a vehicle body 52 suspended on four wheels 54 and associated axles. A propulsion system 56 such as an internal combustion engine, hybrid electric power plant or the like is connected to drive some or all of wheels 54 via a drive train including a transmission (not shown). A steering wheel 58 is used to steer some or all of wheels 54 in order to direct vehicle 50 along a desired path when the propulsion system 56 is operating and engaged to propel the vehicle. A controller 100 provides autonomous self-driving capabilities in response to signals continuously provided in real time from an array of sensors.

In this embodiment, controller 100 is essentially an onboard supercomputer that operates in real time to process sensor signals and output autonomous operation commands to self-drive vehicle 50 and/or assist the human vehicle driver in driving vehicle 50. Controller 100 operates vehicle brakes tip via one or more braking actuators 61, operates steering mechanism 58 via a steering actuator 62, and operates propulsion unit 56 which also receives an accelerator/throttle actuation signal 64. Controller 100 provides autonomous driving outputs in response to an array of sensor inputs including for example:

One or more ultrasonic sensors 66
One or more radar sensors 68
One or more lidar (Light Detection and Ranging) sensors 70
One or more surround cameras 72 (typically such cameras are located at various places on vehicle body 52 to image areas all around the vehicle body)
One or more stereo cameras 74 (at least one such stereo camera faces forward to provide depth-perception object detection and recognition in the path of the vehicle)
A GPS (Global Positioning System) unit 76 provides location coordinates
A steering sensor 78 detects the steering angle
Speed sensors 80 (one for each of the wheels 54)
An inertial sensor 82 that monitors movement of vehicle body 52 (this sensor can be for example an accelerometer(s) and/or a gyrosensor(s) and/or a magnetic compass(es))
Other.

Controller 100 also receives inputs from an instrument cluster 84 and can provide human-perceptible outputs to a human operator via an HMI display(s) 86, an audible annunciator, a loudspeaker and/or other means.

Figure 2:
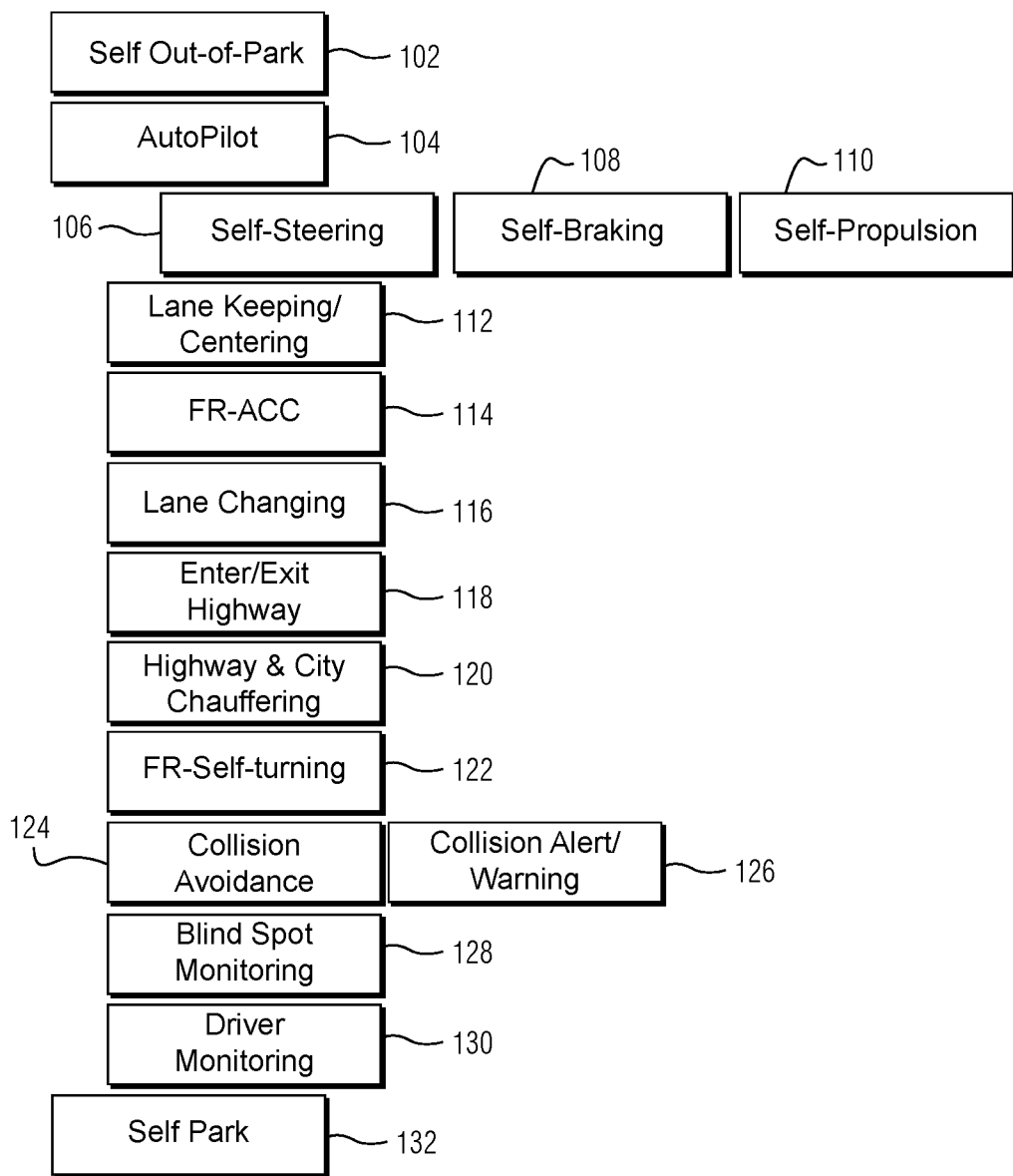
FIG. 2 shows example non-limiting automation control functions.

FIG. 2 shows example control functions performed by controller 100. Any given embodiment or application may have a subset or superset of such control functions, which may include:

Self Out-of-Park 102
Autopilot 104
Self-steering 106
Self-braking 108
Self-propulsion 110
Lane keeping/centering 112
Full range adaptive cruise control (ACC)114
Lane changing 116
Enter/exit highway 118
Highway and city chauffeuring 120
Full range self-turning 122
Collision avoidance 124 and/or collision alert/warning 126
Blind spot monitoring 128
Driver monitoring 130
Self-park 132
Other.

Figure 3:
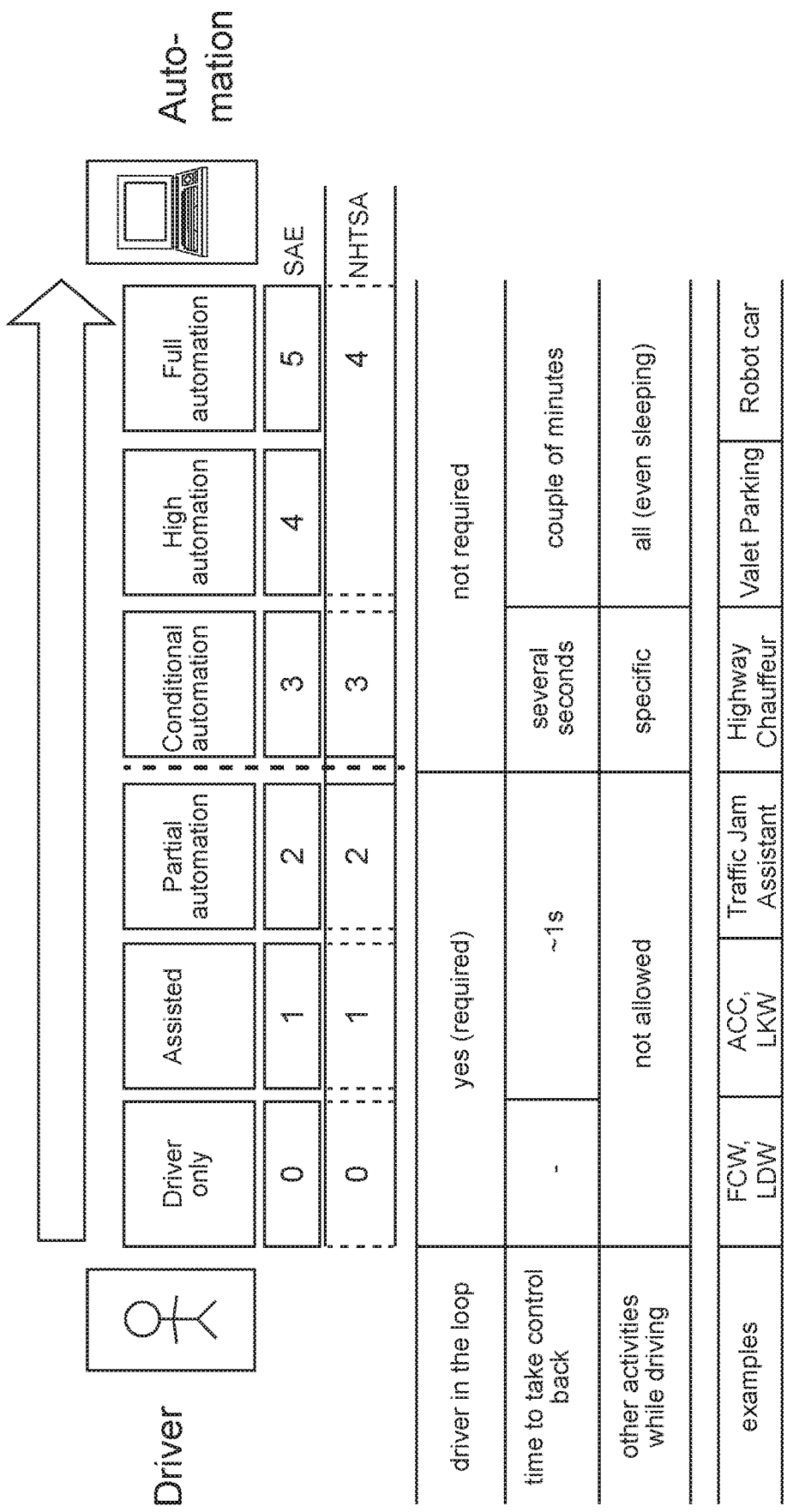
FIG. 3 shows example levels of autonomous driving.

FIG. 3 shows an example chart (developed from SAE, NHTSA and VDA information) showing autonomous driving levels. The degree of automation increases left to right from driver only (Level 0) to Assisted (Level 1) to Partial Automation (Level 2) to Conditional Automation (Level) to High Automation (Level 4) to Full Automation (Level 5). Full automation level 5 is suitable for a robot car, high automation level 4 is suitable for valet parking, conditional automation level 3 is suitable for a highway chauffeur, partial automation level 2 is suitable for a traffic jam assistant, and lower automation levels 0-1 are suitable for other, more manual applications. For Level 4 and 5, the controller 100 performs all aspects of the dynamic driving task, providing appropriate responses to relevant objects and events, even if a driver does not respond appropriately to a request to resume performance of a dynamic driving task. This ambitious goal requires a highly fault-tolerant controller.

These automation levels 0-5 dictate different parameters such as "driving in the loop", "time to take control back", and "other activities while driving". For example, the human driver is required to be in the (control) loop for automation levels 0-2 but is not required for automation levels 3-5. The system must allow the human driver to take back control within about one second for levels 1 and 2, this can be done within several seconds for level 3, and within a couple of minutes for levels 4 and 5. The human driver is not permitted to perform other activities while driving during level 0-2, may perform specific limited activities for automation level 3, and may perform any other activities including sleeping for automation levels 4 and 5.

In some example embodiments herein, conditional, high and full automation levels 3, 4, and 5 is maintained even when a processor component fails.

FIG. 4 shows a drill-down on automation levels 3-5. As can be seen, controller 100 is always responsible for sustained execution of lateral and/or longitudinal control and object and event detection and response (OED) for levels 3, 4 and 5. The driver (as opposed to controller 100) is responsible for fallback performance and dynamic driving tasks at level 3, whereas the system must be able to perform these tasks at levels 4 and 5. At levels 3 and 4, the driving mode circumstance, location capabilities are performed by the human driver in some driving modes whereas in level 5 the system performs these functions as well.

Additional System Relevant Vehicle Level Hazard specifications e as follows:

Vehicle Longitudinal Motion Hazards:

1. Unintended vehicle longitudinal deceleration [ASIL-D]; Ref: J2980-201505
2. Unintended vehicle longitudinal acceleration [ASIL-C]; Ref: J2980-201505
3. Unintended vehicle longitudinal motion [ASIL QM]: Ref: J2980-201505
4. Unintended/Incorrect vehicle direction [ASIL-D]; Assumed
5. Unintended reduction in vehicle deceleration [ASIL QM-DJ]; Ref: J2980-201505

Vehicle Lateral Motion Hazards:

1. Unintended vehicle lateral &rotational notion or unintended yaw [ASIL-D]; Ref: J2980-201505

The DrivePx2 Autonomous Driving, System must meet the following safety goals:

1. Avoid or mitigate unintended vehicle deceleration that may potentially lead to a hazard.
2. Avoid or mitigate unintended vehicle acceleration that may potentially lead to a hazard.
3. Avoid or mitigate unintended vehicle lateral motion (e.g., lateral acceleration) that may potentially lead to a hazard.
4. Avoid or mitigate unintended/incorrect vehicle direction that may potentially lead to a hazard.
5. Avoid or mitigate unintended reduction in vehicle deceleration that may potentially lead to a hazard.
6. Avoid or mitigate unintended vehicle longitudinal motion that may potentially lead to a hazard.

Example Controller Processor Architecture

FIG. 5 is a high-level functional diagram of the overall functions that controller 100 performs in order to implement the automation levels, functions and hazard avoidance automation described above, Controller 100 in one example comprises three processors 202, 204, 206. Processors 202, 204, 206 perform somewhat or entirely redundant processing but they do so independently. In the example non-limiting embodiments, the "redundant" functionality provided by the different processors is not 100% identical. Rather, algorithms and software that perform the same or equivalent functions are designed and implemented differently to provide intentionally-non-identical processing while still performing essentially the same task to provide essentially the same result.

As can be seen in FIG. 5, the redundant tasks/functions performed by processors 202, 204 provide compliance with a lower safety standard (ASIL-B/D) whereas the processes performed by the third processor 206 provide compliance with a higher safety standard (ASIL-D). In other words, the processors 202, 204 together perform all of the required functions to comply with ASIL-B, and the third processor 206 augments their functionality with additional functions e.g., imminent collision or emergency braking) to provide compliance with ASIL-D, in the event of a failure of the third processor 206, the first two processors 202, 204 may be able to continue providing ASIL-B level service and may, also be able to begin providing additional active services to approach or even meet ASIL-D. Meanwhile, if one of the first two processors 202, 204 fails, the third processor 206 may be able to begin providing additional active services to ensure compliance with ASIL-B even if this means ceasing to provide additional functions that provide ASIL-D compliance.

In some embodiments the processing hardware is not identical; for example, processors 202, 204 may be the same but processor 206 is different. Such diverse implementation and intentional non-identity makes the overall system more fault-tolerant to faults caused by software (or software-hardware interface) functionality. For example, if there is a software bug or error in the software running on processor 202, and non-identical software code running on processor 204 provides the same overall result but is designed and implemented differently, there is less likelihood that the same bug will be present in the other processor 204's implementation. Such an intentionally-divergent design reduces the chance of a single point of failure based upon a software design flaw or bug. In an alternative embodiment, the same algorithm could be used on each of the processors 202, 204, 206 to reduce software development cost and complexity, and additional testing and verification could be used to reduce the risk that a software flaw could cause processors 202, 204, 206 to all fail. Even though providing intentionally-divergent software may increase development cost, the corresponding hardware reduction and associated complexity management will provide increased reliability and reduced failure rates.

As discussed above, processors 202, 204, 206 may use deep neural networks to perform some or all of the high-level functions shown. In response to vehicle motion sensors such as the inertial sensing system and other input from vehicular SAS (semi-autonomous systems) 81, the controller performs sensor data processing 140, redundant (see above) sensor data processing 142, vehicle dynamics/vehicle path calculation 144, sensor fusion 146, and other functions that run in low priority logic loops that can be dormant and become active under certain fault conditions.

In the example shown, sensor data processing 140, 142 performed on processors 202, 204, respectively may each include preprocessing 150, DL Processing; of segments/ object detection 152, post processing 154 and free space detection 156. In this example, free space detection 156 performed by processors 202, 204 may comprise a function that runs in a low priority loop or can be dormant and becomes active under certain fault conditions. This can be so because a further processor 206 typically performs vehicle dynamics/vehicle path calculation 144 including projected vehicle path calculation 158, actual vehicle path calculation 160 and plausibility check 162. Sensor fusion is used to combine the outputs of different sensors such as by using Kalman filtering, artificial intelligence or the like in order to learn more from a combination of sensors than is possible from any individual sensor and to increase performance (e.g., when an optical sensor is ineffective due to poor light conditions, a radar sensor is used instead or in addition and when the radar sensor is less effective due to fog, ultrasonics are used instead or in addition). Such sensor fusion in this example includes diversification methods such as diversified sensor fusion software, changing the order/sequence of type of sensor data usage in Fusion, and reordering/resequencing of order of execution of the runnables/sub-functions where possible. Such intentional diversification methods provide improved fault tolerance.

Figure 6:
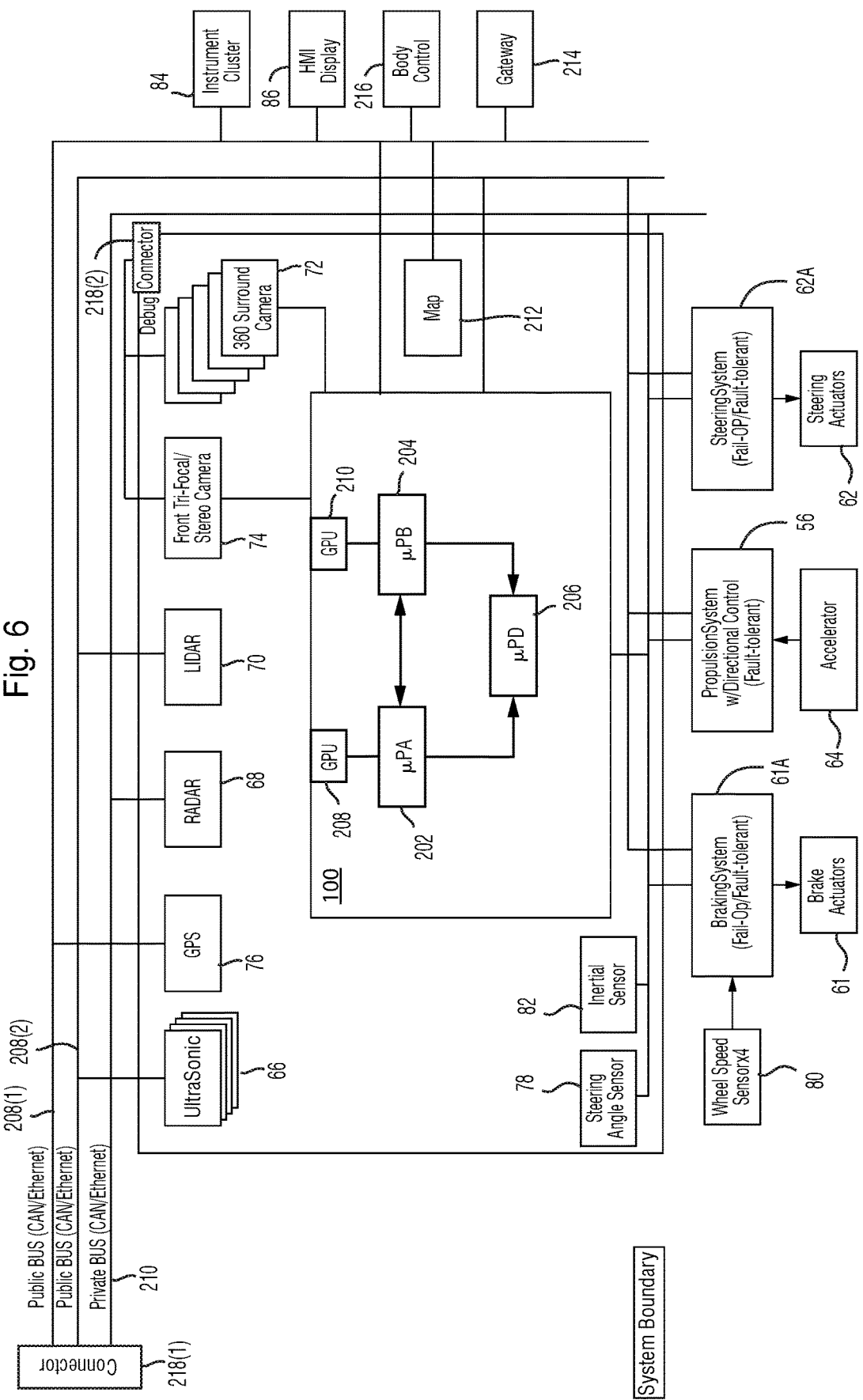
FIG. 6 is a schematic diagram of the example non-limiting self-driving automation system of FIG. 1.

FIG. 6 shows an example high-level block diagram of a three-processor controller 100, and the inputs and outputs to which it is connected. The controller 100 is connected to the various sensors and sub-systems (e.g., a fault operable/fault-tolerant braking system 61A and a fault-operable/fault-tolerant steering system 62A) described above in connection with FIG. 1. Additional functionality is provided by a stored geomapping system 212 which may obtain map refreshes/updates from the cloud via gateway 214 and e.g., a wireless transceiver. Body control 216 (e.g., turn on off headlights, turn on/off windshield wipers, etc.) as well as other functions may also be provided. Connectors 218 provide access by other equipment for expansion and/or debugging.

In the example shown, controller 100 comprises three different, independently-operable processors:

Processor A. (202)
Processor B (204)
Processor D (206).

Each of Processors 202, 204 are connected to a respective GPU 208, 210. In the example shown, all three processors 202, 204, 206 are mounted to a common printed circuit board and disposed within the same enclosure or housing, thus providing a "one-box" controller solution. Of course, there typically are many other processors on board vehicle 50 doing, all sorts of other things (e.g., brake actuation, electronic ignition, climate control, infotainment system, GPS, radar and lidar processing, etc.).

Figure 7A:
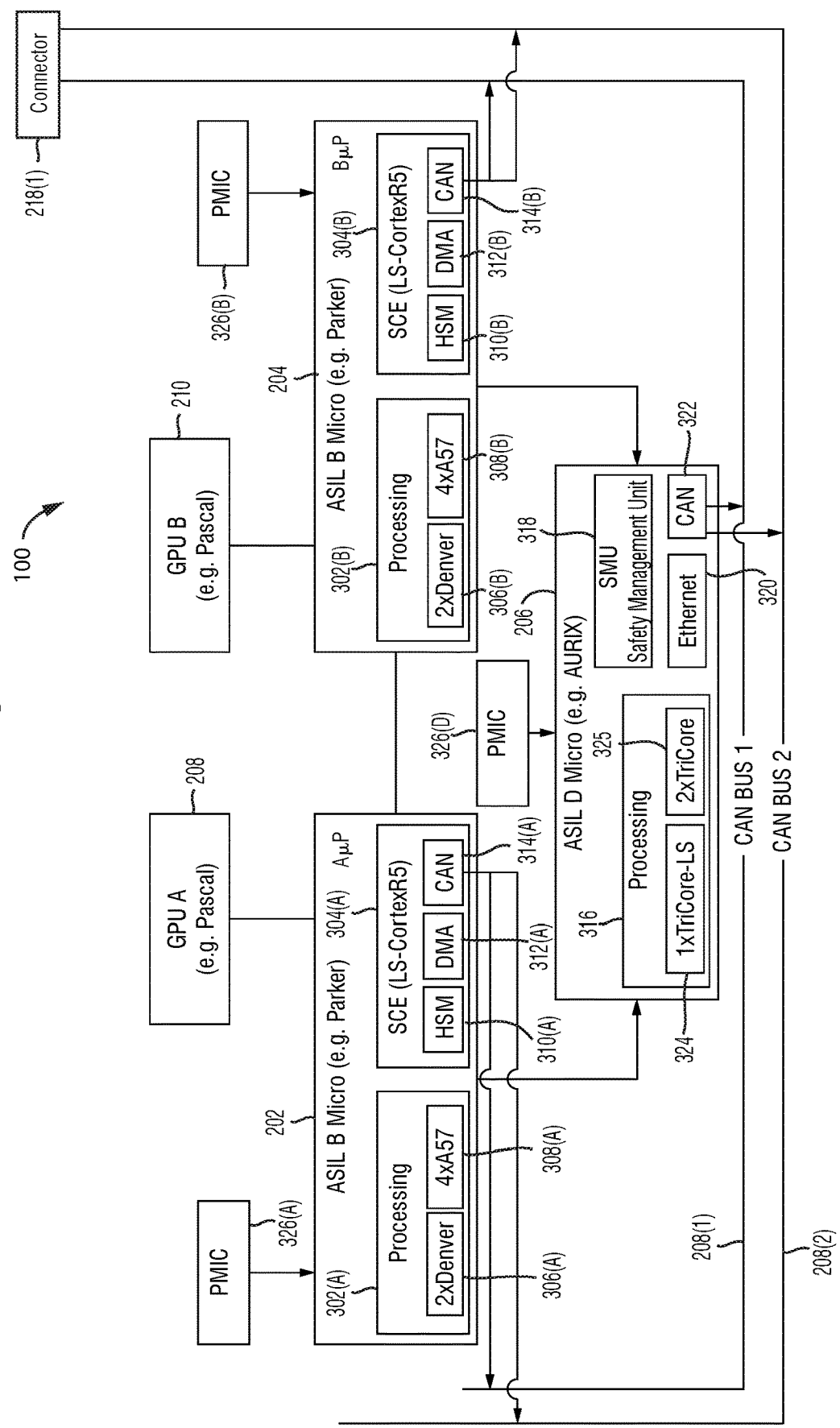
FIG. 7A shows an example self-driving system processing architecture.

FIG. 7A shows a more detailed example diagram of controller 100. In this example, Processors 202, 204 may comprise the same type of hardware ("Parker") and each include a processing; subsystem 302 and a SCE (safety engine) subsystem 304, 316. In the example shown processing subsystems 302 include two parallel-processing cores 306, and an ARM Cortex-A57 microarchitecture 308, The SCE subsystems 204 include a hardware security module (HSM) 310, a direct memory access (DMA) module 312, and a Controller Area Network (CAN) bus interface 314. Each of processors 202, 204 is connected to its own graphics processing unit (GPU) 208, 210 respectively (e.g., Pascal).

In the example shown, the third processor 206 may comprise a different type of processor (e.g., Aurix or Xavier) including an LS (Lock-Step) Tricore 324 and two non-LS Tricores 325. The third processor 206 may include a safety management unit (SMU) 318, and bus interfaces 320, 322. As is well known, lockstep systems are fault-tolerant computer systems that run the same set of operations at the same time (e.g., offset by a few cycles) in parallel; the redundancy allows error detection and error correction since the output from lockstep operations can be compared to determine if there has been a fault and potentially corrected with error correction techniques.

Each of processors A, B, D may be connected to power management integrated circuits (PMIC) 326 to provide independent power management. In an example non-limiting embodiment, each one of the three processors 202, 204, 206 can be provided with independent power supplies and associated mechanisms. The different power providing mechanisms for the different processors could be differently designed to provide additional coverage on a systematic level. In some embodiments, there will be three independent power supplies one for each of the three independently-functioning processors. In other embodiments, there will be at least two independent power supplies, with power supplied for one processor being different that the power supplied for the other two processors.

Figure 7B:
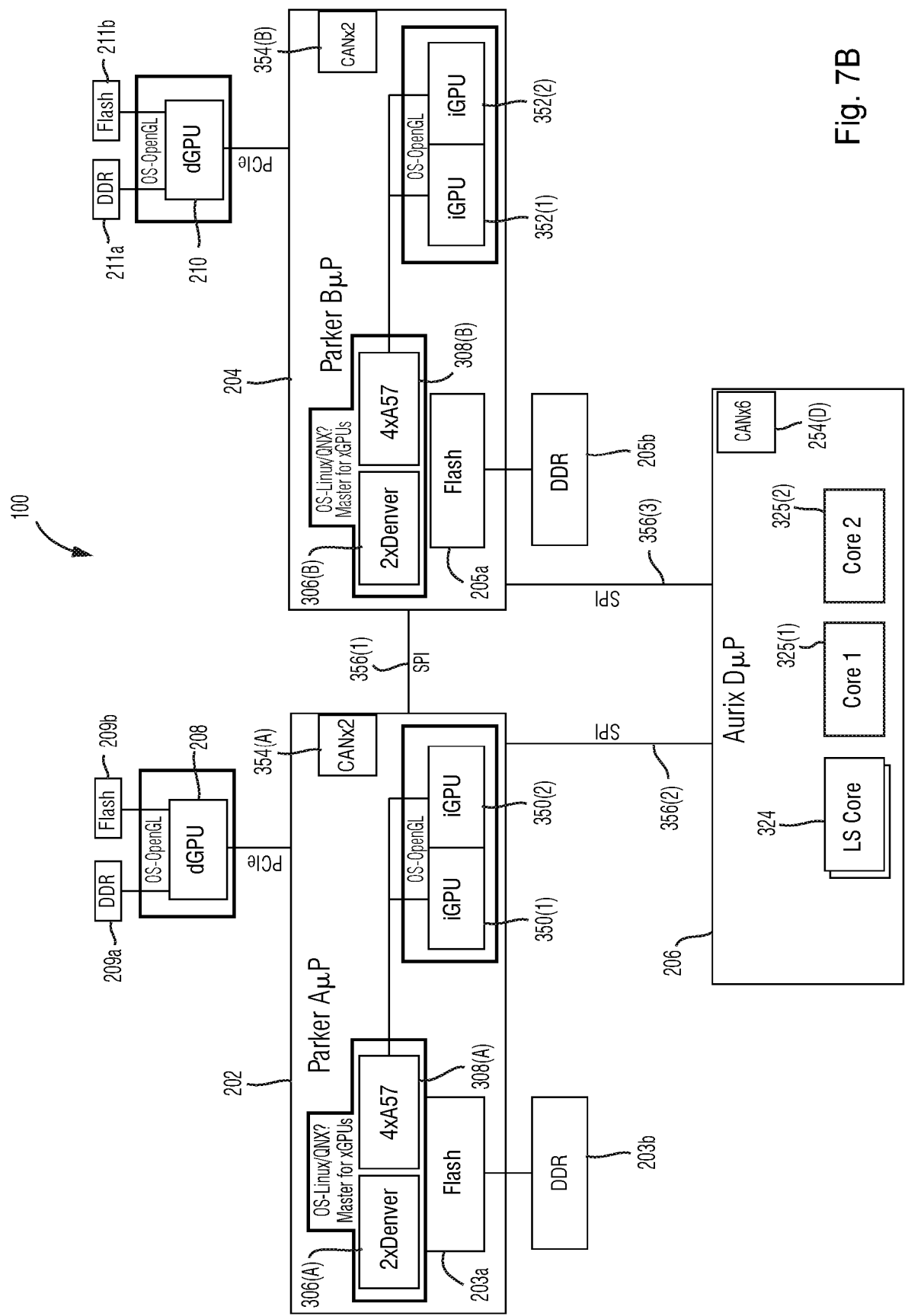
FIG. 7B shows an example self-driving system processing architecture including memory support and other internal GPU and processing core components.

FIG. 7B shows a more detailed hardware configuration diagram of the FIG. 7A architecture. This diagram reveals that each of CPUs 208, 210 is supported by DDR and flash memory 209A, 209B (211A, 211B). Similarly, each of the processors 202, 204 are supported by associated flash memory 203A, 203B (205A, 205B) and DDR memory 203, 205. Each of processors 202, 204, 206 executes program instructions including operating systems such as Linux from computer instructions stored in non-transitory memory such as flash memory 203, 205 and/or DDR memory.

Additionally, each of processors 202, 204 may include any number of internal CPUs 350, 352. Each of GPUs 208, 210, 350, 352 execute CPU commands stored in various non-transitory memory such as DDR 209, flash memory 209 or other.

The processors 202, 204, 206 may communicate with one another via SPI buses 356. Each of processors 202, 204, 206 includes internal multiple independent bus interfaces 354 (preferably there are at least two independent CAN bus interfaces 354 to provide independent interfaces to different CAN buses to provide fault tolerance in case a bus fails).

Example Software Architecture

FIGS. 8 and 9A-9D show example functional fault-tolerant software architectures. In this example, processor 202 and processor 204 each receive the same inputs from the surround camera 72, the front stereo camera 74, the lidar 70, the radar 68, the GPS 76, the map 212, the wheel speed sensor 80, the steering angle sensor 78, and the inertial sensor 80. FIGS. 9A-9D show that the 4xA57 subsystems of processors 202, 204 perform redundant functions, namely:

Perception sensor capture, preprocessing, image processing, object detection, object classification, and object tracking/projection
Localization: sensor fusion, map alignment
Path Planning FIGS. 8 and 9A-9D similarly show that the processing cores 306(a), 306(b) of the two processors 202, 204 redundantly perform algorithms that execute under normal operating conditions and are dominant/active and may potentially run on one set of cores (e.g., main cores 306) or the other set of cores (e.g., A57 308), namely:

Perception: sensor capture, preprocessing, image processing, object detection, object classification, and object tracking/projection
Localization: sensor fusion, map alignment
Path Planning
Control (consistency checks, decision-making, and send actuation commands).

FIGS. 9A-9D also show that the SCE (safety engine), subsystems 304(A), 304(B) of processors 202, 204 similarly perform algorithms that may execute under normal operating conditions but stay dormant until fault in the system can make it dominant/active for fail-operability, namely:

Vehicle dynamics and controls:
Controls
Rationality cheeks
Decision-making, and
Send actuation commands.

FIGS. 8 and 9A-9D show that processor 206 performs algorithms that execute under normal operating conditions and are dominant/active and may potentially run on the LS core 324, namely:

Vehicle dynamics and controls
Controls
Rationality checks
Decision-making, and
send actuation commands.

FIGS. 8 and 9A-9D show that processor 206 performs algorithms that may execute under normal operating conditions but stay dormant until fault in the system can make it dominant/active for fail-operability, namely:

Perception: sensor capture, preprocessing, image processing, object detection, object classification, and object tracking/projection Localization: sensor fusion, map alignment Path Planning Control (consistency checks, decision-making, and send actuation commands).

This, processor 206 executes algorithm under normal conditions that processors 202, 204 execute but keep dormant until a fault occurs, and vice versa.

Despite instances of apparent exact redundancy, there are differences between the functionality implemented by the various processors 202, 204, 206, for example:

Processing by processor 202 is independent of processing by processor 204.

Processor 202 performs path planning calculation in core 308(a) (GPU 208) using front camera 74 and surround camera 72, and in A57 unit 308(A) (using an internal iGPU 309(A) if available) using lidar 70 and radar 68.

For processor 204, it is exactly the opposite: processor 204 performs path planning calculation using the A57 unit 308(B) and GPU 210 using cameras 72, 74, and in the processor core 308(B) (using iGPU 309(B) if available) using lidar 70 and radar 68. Such redistribution of functions based on input sensors provides fault tolerance on several different levels.

Additional safety mechanisms are implemented in the example embodiments:

Isolation of memory usage by core 306(A) and A57 unit 308(A)

Isolation of memory usage by core 306(B) and A57 unit 308(B)

MPU to protect against illegal memory access

Compare results at SCE 304(A), 304(B)

Compare results at processor 206

SOH check (elaborated challenge and response between processors 202 and 204, processor 206 and processor 202, processor 206 and processor 202 over SPI busses.

Figure 9A:
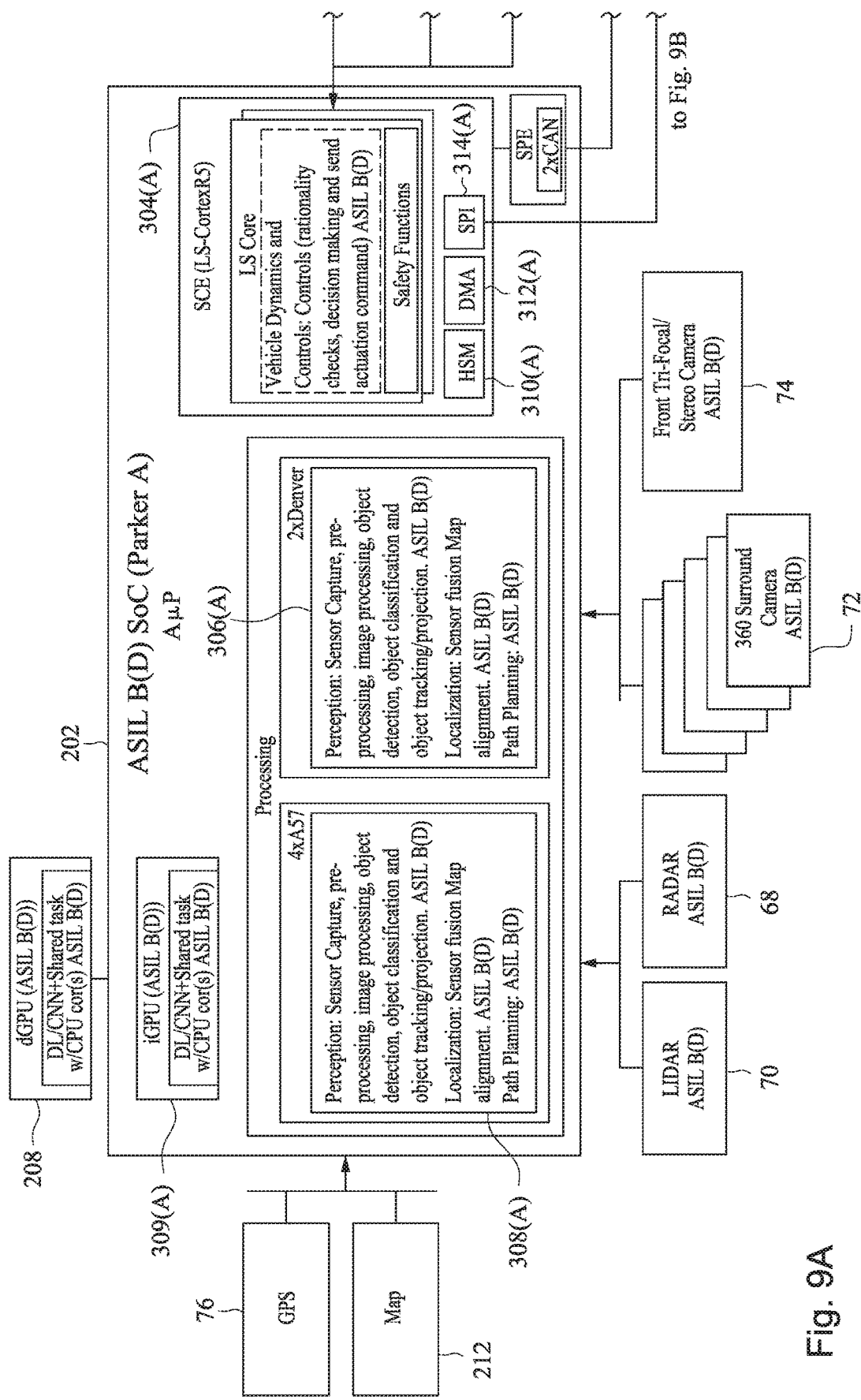
FIGS. 9A-9D together shows a more detailed example non-limiting functional diagram for a three-processor self-driving automation system.
Figure 9B:
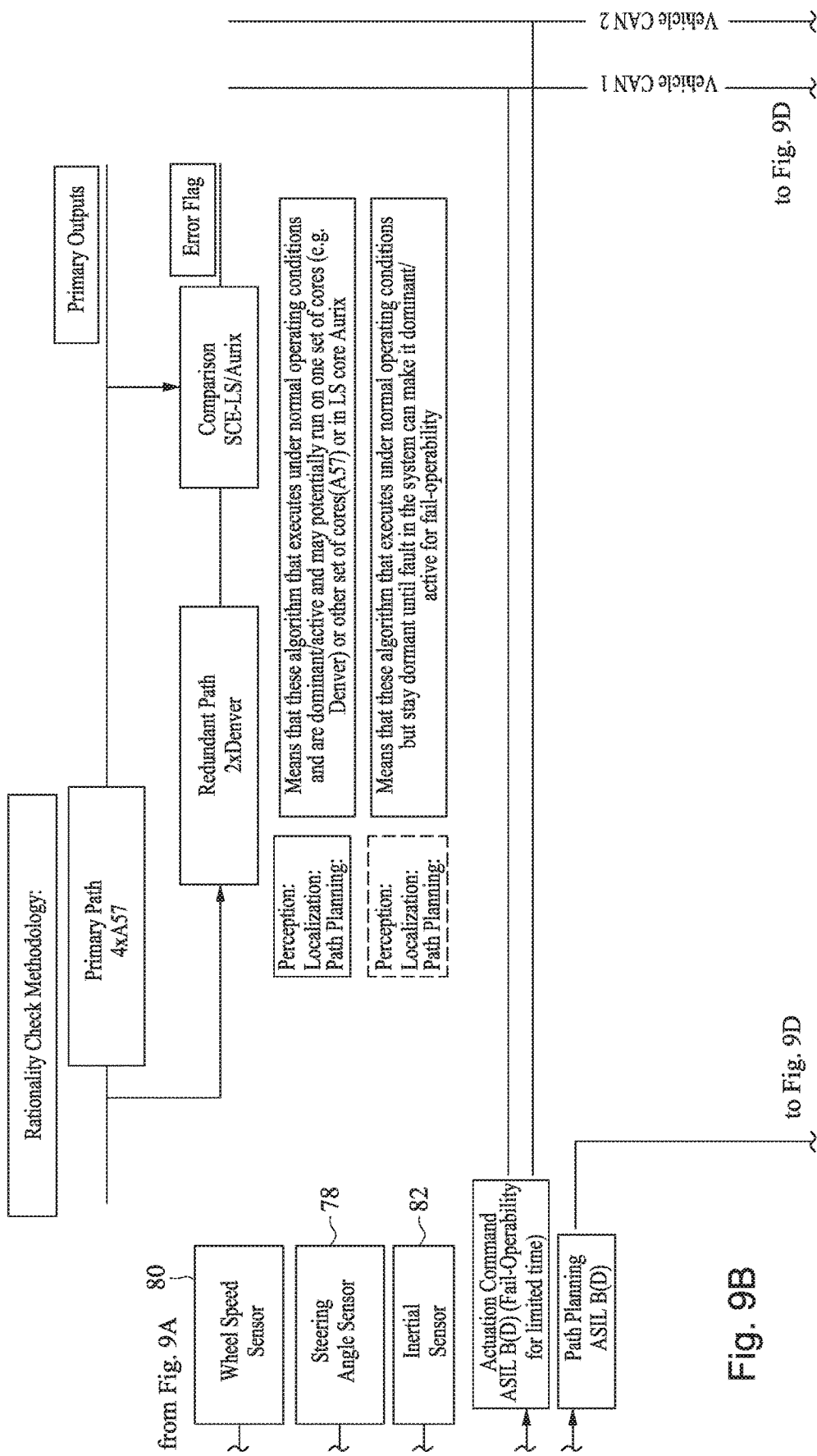
Figure 9C:
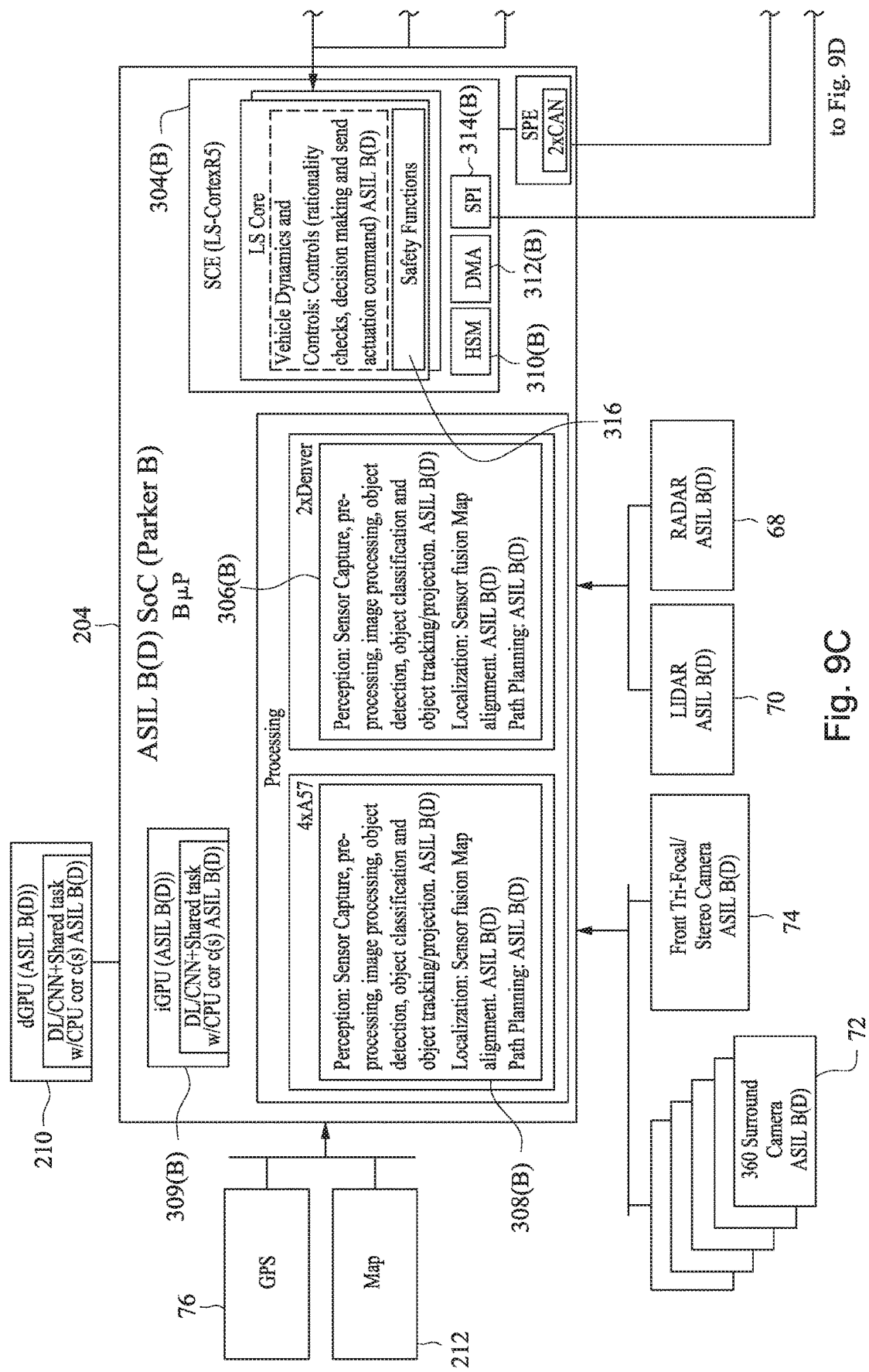
Figure 9D:
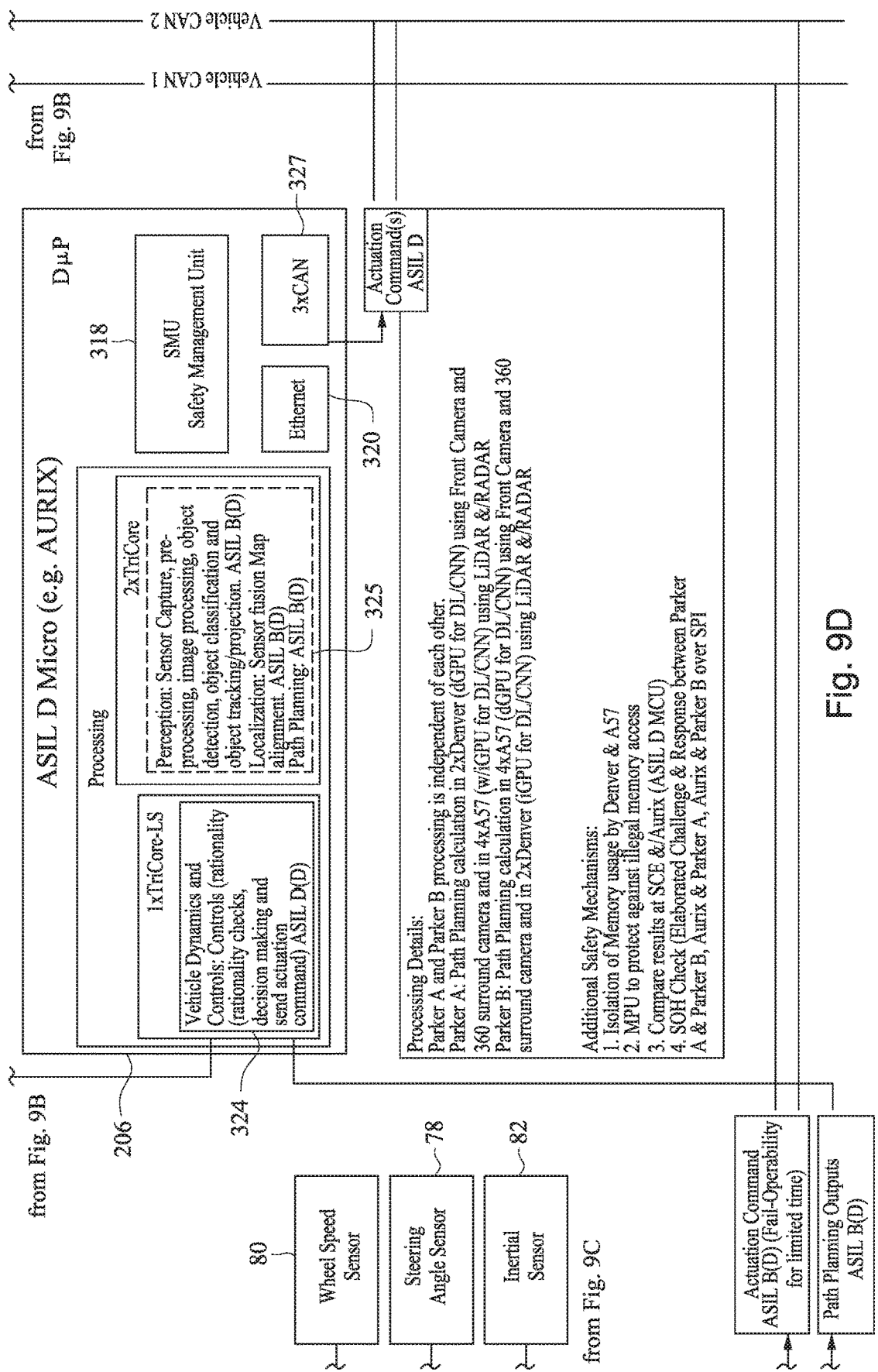

As the upper righthand portion of FIG. 9B shows, the primary output path is generally from the A57 units 308(A), 308(B) of processors 202, 204, with a redundant path comprising processor cores 306(A), 306(B) and a comparison between the two by the safety engine of processor 206 to generate an error flag if processor 206 detects significant disagreement between the control outputs generated by processors 202, 204.

In the example embodiments, processors 202, 204 are independent of each other and use different inputs. For example, processor 202's path planning calculation is performed by core 302(A) for DL CNN based on the front camera and the 360 degree surround camera, and also performs path planning calculation using its A57 core 304(A) (with iGU for DL/CNN) based on lidar and radar. In contrast, processor 204 also performs path planning calculation, but does so using its A57 core 304(B) (dGPU for DL/CNN) using front camera and 360 surround camera) and in its Denver core 302(B) using lidar and radar.

Additional safety mechanisms include isolation of memory usage by the cores 302, 304; use of memory management to protect against illegal memory accesses; comparing results at the safety engine and processor 206 (ASIL-D) MCU); an elaborated challenge and response between processors 202, 204, 206 to perform a state of health (SOH) checks.

The following are System Safety Functional Architecture Assumptions:

1. The object sensing inputs assumed (initial) to be at processors 202, 204 (ASIL-B). As is well known, Automotive Safety Integrity Level (ASIL) is a risk classification scheme defined by the ISO 26262-Functional Safety for Road Vehicles standard, incorporated herein by reference. The ASIL is established by performing a risk analysis of a potential hazard by looking at the Severity, Exposure and Controllability of the vehicle operating scenario. The safety goal for that hazard in turn carries the ASIL requirements. There are four ASILs identified by the standard: ASIL-A, ASIL-B, ASIL-C & ASIL-D, ASIL-D dictates the highest integrity requirements on the product and ASIL-A the lowest. Thus, ASIL-D provides a higher level of autonomous safety as compared to ASIL-B.

2. Independent sensor data (of Camera, radar, lidar) processing in processors 202, 204

3. Independent Algorithm for pre and post-processing, application—including path planning, vehicle dynamic calculation and actuation command in both processor 202 and processor 204 (with vehicle dynamics and actuation commands calculated in the safety engine SCE's 304 of processors 202, 204 in low priority slow loop rate)

4. CAN communication from processors 202, 204 to external nodes

5. Actuation command arbitration in respective actuation system (e.g., braking, steering, propulsion)

6. Periodic state of health monitoring among all the independent functional blocks (GPUs 208, 210; processors 202, 204; and processor 206)

7. Processing, the algorithm redundantly w/hardware diversity in processor 202, 204 cores 306; processor 202, 204 Cortex A57 cores 208; iGPU cores 309, and dGPU 208, 210.

8. Software Functions/Features are developed at least at the stated ASIL (e.g., Sensor Fusion' w/ASIL-B(D) developed per ISO26262 ASIL-B software development guidelines) of that function/feature.

9. System level monitoring of System from actuation systems (e.g., Braking System 61A, Steering System 62A, Propulsion System 56) over serial data bust(s).

10. Processor 206 to act as primary source for control outputs. In case unrecoverable fault in processor 206, processor 202 or processor 204 will be the backup for control outputs. Such unrecoverable faults should be notified to the driver for service. In some driving modes when the system limited availability or in fault/degraded state, the driver should be notified to take over control within a specified time. If the driver does not take control within the specified time, the system should conclude the trip safely and as quickly as possible.

11. The System should be able to disable communication independently from processor 202, processor 204 or processor 206 with actuating systems as required for safe operation of the vehicle.

12. The actuation systems are assumed to be fault-tolerant or fail-operational and can provide minimum vehicle maneuverability for a safe termination of a trip in case of total loss of system availability. In situation like this should be notified to the driver for service.

13. Fault Model, Fault Categories, Fault Maturation, Fault containment, Dynamic Resource Allocation, and Fault Reaction to support fault tolerance and fail operability 14. Degraded state may provide limited features (limited functionality) &/Limited authority 15. Actuation system(s) offer(s) fault tolerance w/mechanical back up or electrical back up (as necessary) to the driver to maintain/provide (limited) vehicle operation with existing fault in the system to continue operation until vehicle ends trip safely.

FIG. 10 shows an example System Single Element Fault Analysis. The example system has three major functional elements: processor 202 ("Parker A"), processor 204 ("Parker B") and processor 206 ("Aurix"). Each element is/can be powered independently. The FIG. 10 fault analysis shows that the system is redundant and each major element of the system is individually and physically separated from other elements.

The FIG. 10 analysis shows that in the event of a single failure, which may fail one of the 3 major functional blocks, system fault reaction can be initiated by using the remaining available functional blocks. The loss caused by a single failure will not prevent the system from performing its function. In this diagram, "Parker A" refers to processor 202, "Parker B" refers to processor 204, and "Aurix" refers to processor 206. In the event a category 1 fault is detected for processor 202 but that processor remains operational, processor 206 begins to output primary control, processor 202 is recovered and the system remains safe and in active control. Similar actions and effects occur if processor 204 is detected to have a category 1 failure. If processor 202 is detected to have a category 2 fault, processor 206 takes over the primary control output generation previously performed by processor 202 before it failed, and processor 202 is recovered (power-cycling to perform a hardware reset if necessary). The vehicle operation remains safe but the driver is notified. Similar actions occur for a category 2 fault by processor 204. If processor 206 experiences a category 2 fault, control is switched to processors 202, 204 (one of these acts as a backup for the other; the operation remains safe and the driver is notified. If a category 3 fault occurs, the system is able to exercise only limited control and the driver is notified to take over driving (if a passenger vehicle) and to take the vehicle for service. Note that in many of these fault conditions, the disclosed embodiment is able to maintain active control even in the event of a processor fault.

Fault Detection and Recovery "Animation"

FIGS. 11A, 11B, 11C and 11D together animate examples of how controller 100 adapts when one (or more) of the processors 202, 204, 206 experiences a fault.

Figure 11A:
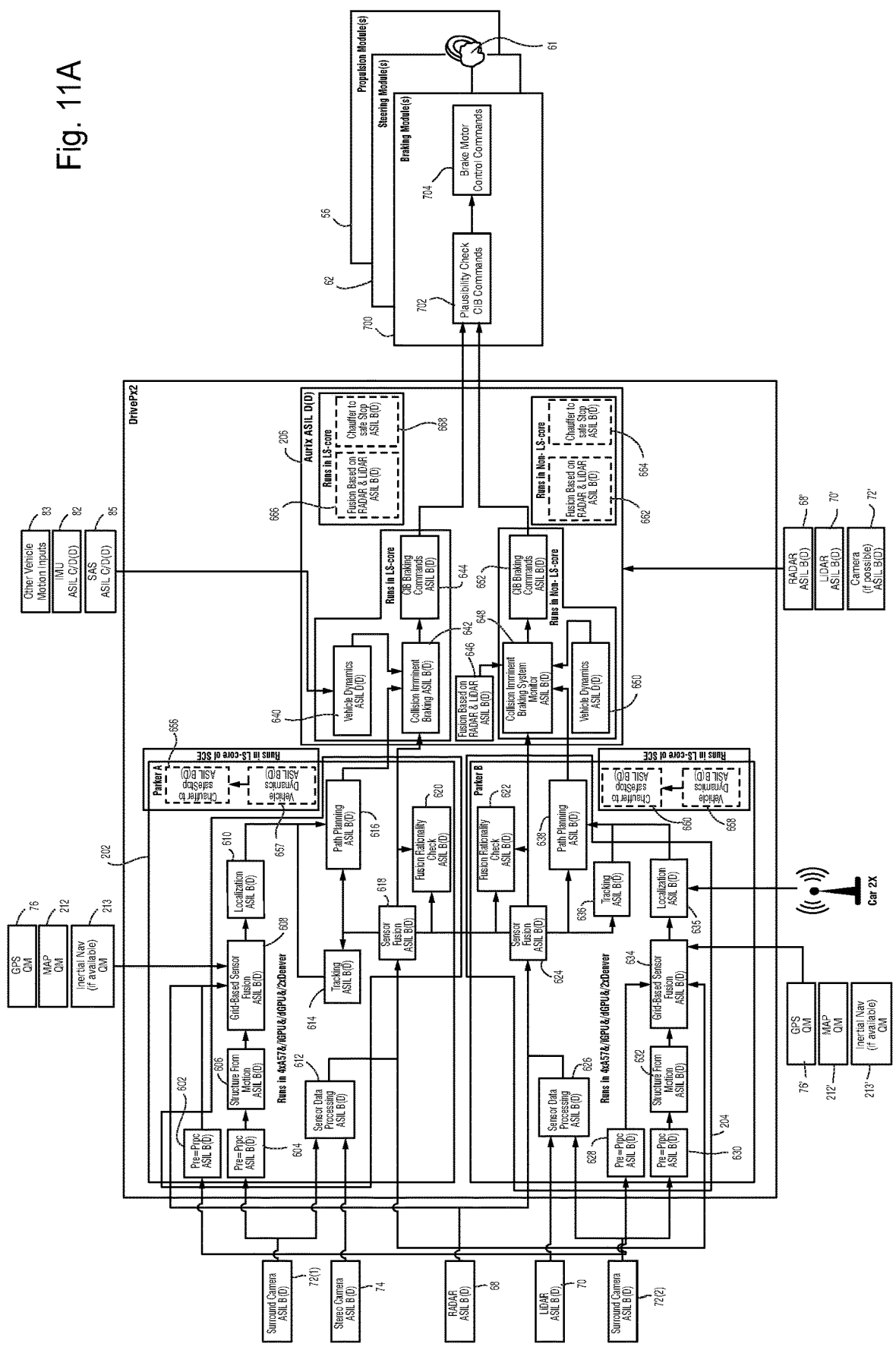
FIGS. 11A-11D show example non-limiting reconfigurations the system performs upon detecting that different processors have failed.

FIG. 11A shows a fully functional controller 100 in "normal operation". In this mode, all three processors 202, 204, 206 are operating properly. Thus, each of processors 202, 204 preprocesses (602, 604) data from surround camera (s) 72 (different cameras can be used by the different processors for fault tolerance and functional distribution as discussed above), structure from motion (606), perform grid-based sensor fusion (608) of the processed surround camera(s) and the inertial sensor outputs and the Map 212 and OPS 76 geodata; perform localization (610) and feed this data into path planning (616) and tracking (614). Processor 202 also performs sensor data processing (612) of the stereo camera data combined with the surround cameras and provides this data to its own sensor fusion (618) as well as sharing it with grid-based sensor fusion (634) that processor 204 performs. Processor 204 meanwhile performs sensor data processing (626) of the lidar system 70 and provides the output to its own sensor fusion (624) as well as to the grid-based sensor fusion (608) that processor 202 performs. Radar 68 data is processed by processor 204's sensor fusion (624), and is also provided to processor 202's grid-based sensor fusion block (608). Processors 202, 204 provide their respective ASIL-B sensor fusion data to different braking blocks (642, 648) of processor 206: a collision imminent braking block (642) (for the processor 202 data) and a collision imminent braking system monitor (648) (for the processor 204 data)—which block also receives fusion based on radar 68 and lidar 70 (646).

Processor 206 includes two different vehicle dynamics blocks (640, 650) that interact with respective braking system blocks (642, 648). Both braking blocks (642, 648) are capable of generating braking commands (644, 652). FIG. 11A shows that one set of braking functions runs in the processor 206's core, and another set of braking functions runs in the processor's non-LS core. Note that processor 206 also directly receives the lidar 70', radar 68' and camera 72' data as well as other vehicle motion inputs 83, the inertial (IMU) 82 data and the SAS (semi-autonomous system) 85 data, and so does not need to rely on processors 202, 204 to get this data.

Figure 11B:
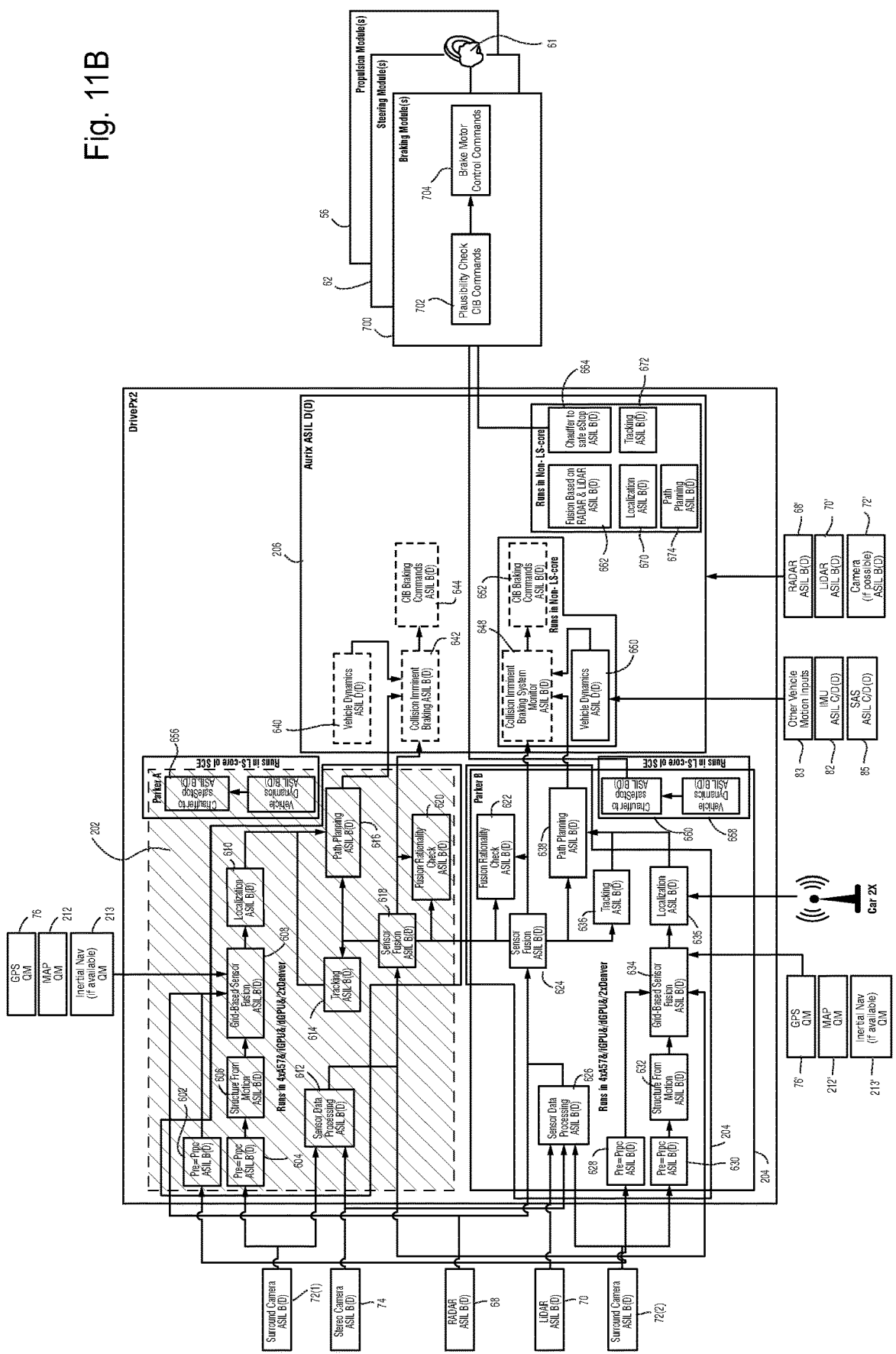
Figure 11C:
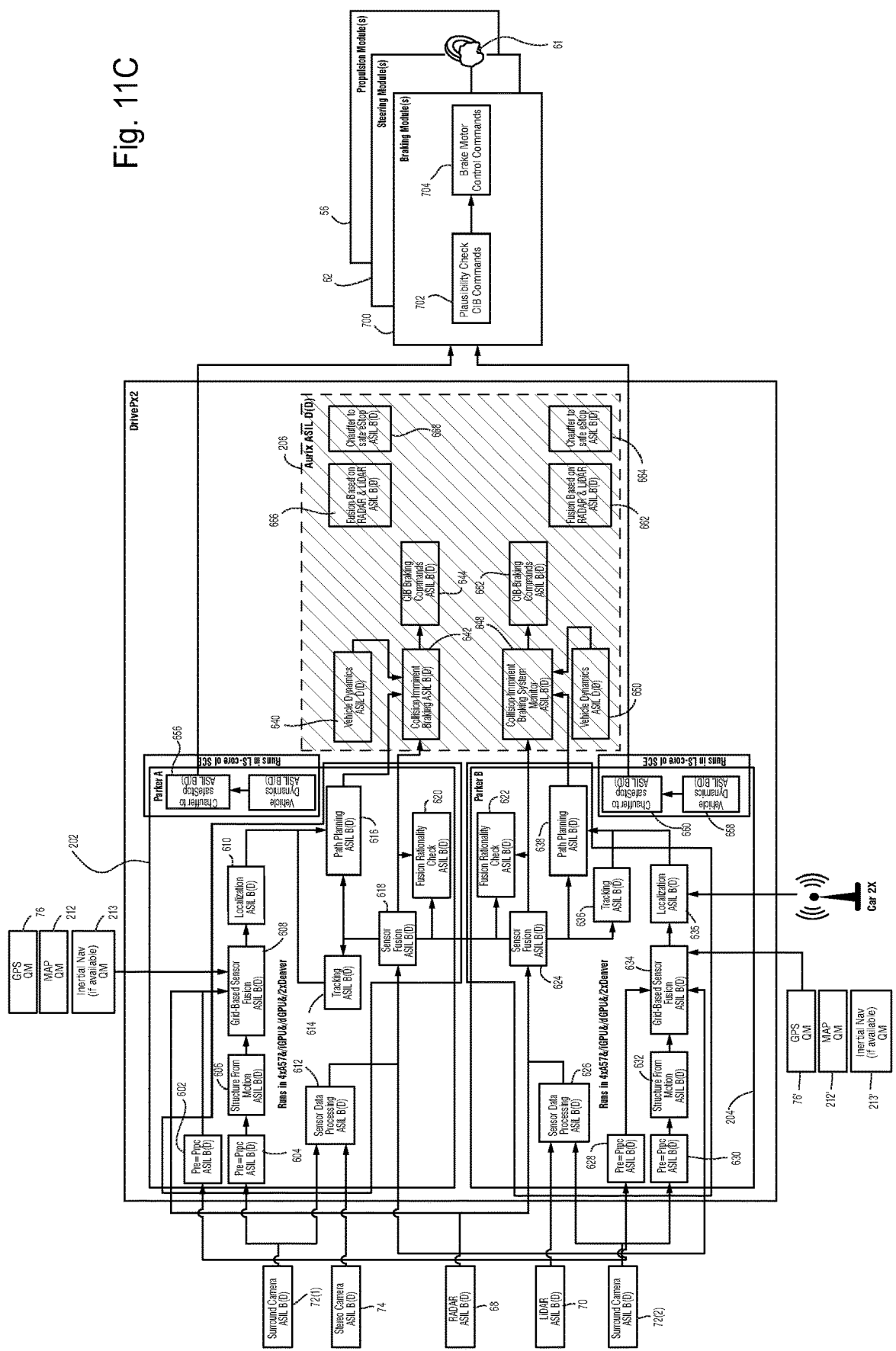
Figure 11D:
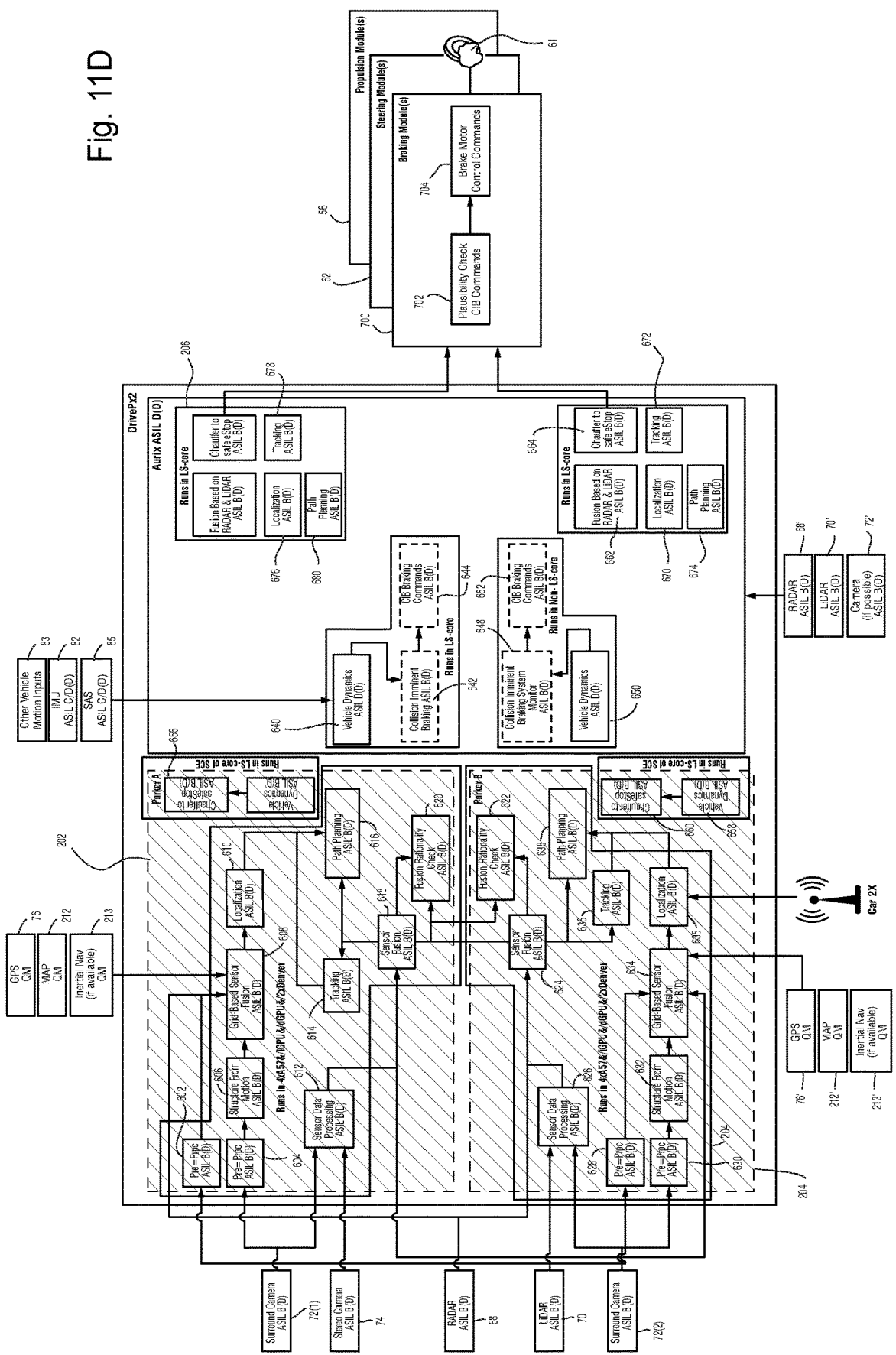
Figure 12:
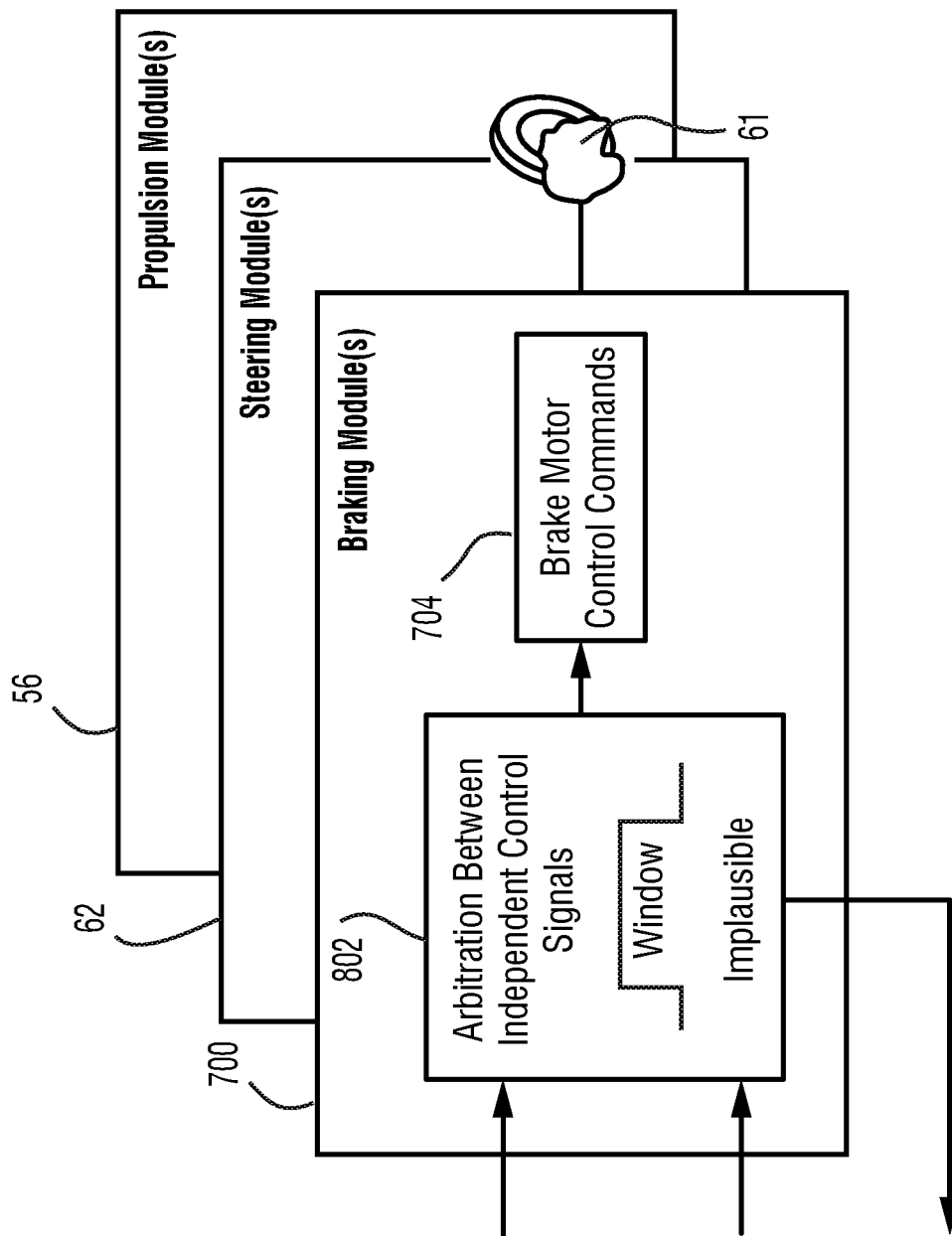
FIG. 12 shows example non-limiting controlled peripheral device arbitration.

FIGS. 11A and 12 also show a braking module 700 that receives braking commands from each of the two independent braking command blocks (642/644, 648/652) of processor 206. The braking module 700 performs a plausibility check 702 on commands it receives, arbitrates (802 of FIG. 12) between the received commands if necessary, and generates brake actuator (motor) control commands 704 to actuate the braking system. Similar arrangements are provided for steering and propulsion (see FIGS. 11B, 11C, 11D and 12).

Because example non-limiting embodiments provide independent processing by similar but non-identical algorithms, actuation control results from the different processors making different decisions. As an example, when vehicle cameras indicate that a vehicle ahead is slowing down so that braking needs to be applied, two independent processors 202, 204 and/or processes 642, 648 independently processing the incoming sensor data may each determine that braking should be applied, but they may differ in the amount in their respective determinations of the amount of braking that should be applied. The two independent processors 202, 204 and/or processes 642, 648 each provide a braking command and the two independent commands are arbitrated by the peripheral braking controller 700 that is connected to receive both commands. If each of the two independently-operating processors 202, 204 or processes 642, 648 generate the same command (e.g., apply braking at 0.5 g), the arbitration required is simple and the braking controller will simply follow the instruction to apply braking at 0.5 g. But suppose the braking controller 700 receives commands from two different processors 202, 204 or processes 642, 648 that each command it to provide braking, but the amount of braking differs (e.g., one controller commands 0.5 g braking, the other controller commands 0.3 g, braking). Because the braking controller 700 is not privy to any of the information informing the processors 204, 204, 206 concerning a braking decision, the braking controller needs to arbitrate between these two different commands.

One way to arbitrate would be to apply braking at the lowest value (0.3 g for example). In another scenario, assume there is a braking threshold of 0.5 g, and one processor/process commands to apply brake and the other one does not. In one scenario, the braking module 700 may not apply any braking. In another scenario, the braking module 700 might apply braking but apply a lighter braking than was commanded by the processor that requested braking at 0.5 g (e.g., 0.3 g of braking). Another possibility is to follow the command to apply braking at the specified force of 0.5 g, but to notify the operator (see "Plausible" output of FIG. 12) that the autonomous system is not at full confidence and give the driver the opportunity to take over with manual driving.

In example non-limiting embodiments, synchronization between the different processors/processes is not required. Rather, the independent operation of the different processors means that the processing; and associated output generation will be only loosely synchronized. The arbitration decisions performed by the peripheral devices 700 etc, takes this lack-of-synchronization into account when it arbitrates between different commands received from different processors (e.g., 202, 204). In addition, the communication buses used to communicate the commands from the processors to the peripherals may also be non-deterministically unsynchronized (e.g., due to contentions and other mechanisms on the bus), which is an additional timing factor the arbitration on the peripheral devices takes into account. As an example, when a braking controller 700 receives a command from one processor, it may define a certain timing window (see FIG. 12) that it times (waits) to see if another processor provides a similar command before making an arbitration decision. Such a tolerance is built in in order to insure that the peripheral modules are responsive to commands issued by multiple independent processors. Such time windows in the range of 10-25 milliseconds may be acceptable to account for the only loose synchronization between the different processors 202, 204. However, the timing window should be short enough that the peripheral devices 700 can still detect a timeout. If a second message arrives after the timeout period, then the peripheral device 700 detects this with its plausibility check 702 and may ignore the second command or the first command. In some embodiments, the braking module 700 could provide feedback or notification back to controller 100 if the plausibility check indicates that one or the other of the independent control signals is the result of a fault.

In general, it is preferable that the peripheral device 700 receives redundant commands so it can arbitrate the results between two different independent processors, but the peripheral devices are also capable of actuating based only on commands from a single processor.

FIG. 11A indicates in dashed lines functions performed by each of processors 202, 204, 206 that execute under normal operating conditions but stay dormant (or execute under low priority) until fault in the system can make it dominant/active for fail-operability, namely:

Processor 202 performs vehicle dynamics (657) and chauffeur to sale-stop (656) in the LS core of the safety engine (SCE);

Processor 204 also performs vehicle dynamics (658) and chauffeur to safe-stop (660) in the LS core of the safety engine (SCE); and Processor 206 performs two instances of fusion based on radar and lidar (662, 666) and chauffeur to safe stop (664, 668), one instance in LS core and one in a non-LS core.

Processors 202, 204 each also perform respective fusion rationality checks (620, 622) and can notify themselves, each other and processor 206 of the results.

When One Processor Faults

FIG. 11B shows what happens when processor 202 fails (as indicated by the hatched lines in the upper left-hand corner). Upon this failure, processor 204 changes the state of one instance of its vehicle dynamics (658) and chauffeur to safestop (660) from dormant to active. Meanwhile, processor 206 changes its original vehicle dynamics (640), collision imminent braking (642, 648) and braking command generating (644, 652) blocks that were relying on information from the now-failed processor 202 from active to dormant, changes one instance of its dormant fusion (662) based on radar and lidar and chauffeur to safestop (664) to active while terminating the other instance; and begins executing new localization (670), tracking (672) and path planning (674) blocks to replace the corresponding functions lost when processor 202 failed. An alert is sent to the driver; if the system does not have confidence to continue autonomous operation, it may execute a chauffeur to safe stop or request the driver to take over.

When a Different Processor Faults

FIG. 11C shows what happens when processor 206 fails (as indicated in the cross-hatched lines in the center of the drawing). In this case, processors 202, 204 continue as before but make their dormant functions (656, 657, 658, 660) active to compensate for the failure of processor 206 and direct the outputs of this blocks to the external interfaces instead of providing them for/through now-failed processor 206. The driver receives a warning and as above, if the system does not have confidence to continue autonomous operation, it may execute a chauffeur to safe stop or request the driver to take over.

When Two Processors Fault

FIG. 11D shows what happens when both of processors 202, 204 fail (once again, as indicated by the cross-hatched lines). If this should occur, processor 206 makes all of its dormant functions (662, 664, 666, 668) active, changes its original braking blocks (642, 644, 648, 652) from active to dormant, and also begins running redundant localization (670, 676) tracking (672, 678) and path planning (674, 680) instances in both LS and non-LS cores. The driver receives a warning and as above. In this case, the example system does not have confidence to continue autonomous operation, so it executes a chauffeur to safe stop (note the control line reconfiguration from these now-active blocks (664, 668) to braking module 700, steering module 62, and propulsion module 56) or request the driver to take over. Even with two processors 202, 204 failing, the architecture maintains redundancy by executing redundant functions in both the LS and non-LS cores of processor 206. Safety has been maintained at all times despite the faults.

While the invention has been described in connection with what is presently considered to be the most practical and preferred embodiments, it is to be understood that the invention is not to be limited to the disclosed embodiments. As an example, while the discussion above has been presented using Nvidia hardware as an example, any type or number of processor(s) can be used. On the contrary, is intended to cover various modifications and equivalent arrangements included within the spirit and scope of the appended claims.

What is claimed is:

1. A control system comprising:
a first sensor;
a second sensor;
a third sensor;
at least one input bus connected to the first sensor, the second sensor, and the third sensor;

an electronic controller comprising a first processor, a second processor, and a third processor each coupled to the at least one input bus;
  wherein the first processor, the second processor, and the third processor each independently process signals from the at least one input bus to provide control signals;
  the first processor providing first control signals in response to a first combination of the first sensor, the second sensor, and the third sensor;
  the second processor providing second control signals in response to a second combination of the first sensor, the second sensor, and the third sensor different from the first combination;
  the third processor providing third control signals in response to a third combination of the first sensor, the second sensor, and the third sensor different from at least one of the first combination or the second combination; and
  an intelligent control signal arbitrator that receives the first control signals, the second control signals, and the third control signals and arbitrates between them to perform at least one control function.

2. The system of claim 1, wherein the third processor performs a rationality check based on a primary path from the first processor and a redundant path from the second processor.

3. The system of claim 1, wherein the first processor, the second processor, and the third processor are independently powered.

4. The system of claim 1, wherein the first processor, the second processor, and the third processor execute different software to perform tasks in common between the first processor, the second processor, and the third processor.

5. The system of claim 1, wherein the first processor, the second processor, and the third processor process different inputs from the at least one input bus to perform tasks in common between the first processor, the second processor, and the third processor.

6. The system of claim 1, wherein the first processor is structured to perform a set of autonomous control functions, and the third processor is structured to perform autonomous functions additional to the set of autonomous control functions performed by the first processor and also to execute autonomous functions redundant to the set of autonomous control functions upon failure of the first processor.

7. The system of claim 1, wherein the at least one input bus comprises first and second independent redundant input busses.

8. The system of claim 1, wherein:
  the first processor and the second processor each independently execute the same task in parallel, and
  software code the first processor executes to perform the task is implemented differently than the code the second processor executes to perform the task.

9. The system of claim 8, wherein the first processor and the second processor each have a first processing core and a second processing core different from the first processing core, the first processor being programmed to execute the task using the first processing core, the second processor being programmed to execute the task using the second processing core.

10. The system of claim 1, wherein the first processor and the second processor are non-identical.

11. The system of claim 1, wherein the first processor and the second processor each generate control outputs by redundantly executing a task, and control signals the first processor generates are different from control signals the second processor generates.

12. The system of claim 1, wherein the first processor and the second processor generate the control signals asynchronously.

13. The system of claim 1, wherein the second processor performs a task dormantly, and activates the dormant task upon detecting the first processor has failed.

14. The system of claim 1, wherein the first processor and the second processor are structured to continually monitor the operation of each other to detect a failure.

15. The system of claim 1, wherein the first processor and the second processor are independently powered.

16. The system of claim 1, wherein the third processor monitors the operations of the first processor and the second processor and the second processor monitors the operation of the first processor and the third processor.

17. The system of claim 1, wherein:
  the first processor and the second processor each independently and redundantly execute a task in parallel,
  wherein the first processor uses a first algorithm to perform the task and the second processor uses a second algorithm that is not identical to the first algorithm to perform the task.

18. The system of claim 1, wherein:
  the first processor comprises a first processing core and a second processing core different from the first processing core, and
  the second processor comprises a third processing core and a fourth processing core, the third and fourth processing cores being different from the first processing core,
  the first processor and the second processor each independently and redundantly execute a task in parallel, and
  the first processor is programmed to execute the task using the first processing core, and the second processor is programmed to execute the task using the third processing core.

19. The system of claim 1, wherein the first sensor comprises a RADAR sensor, the second sensor comprises a LIDAR sensor, and the third sensor comprises an optical sensor.

20. The system of claim 1, wherein the first processor is connected to a first GPU providing first deep learning operations, and the second processor is connected to a second GPU providing second deep learning operations.

* * * * *